US012247998B2

(12) United States Patent
Dapolito et al.

(10) Patent No.: US 12,247,998 B2
(45) Date of Patent: Mar. 11, 2025

(54) SCATTERING-TYPE SCANNING NEAR-FIELD OPTICAL MICROSCOPY WITH AKIYAMA PIEZO-PROBES

(71) Applicants: THE RESEARCH FOUNDATION FOR THE STATE UNIVERSITY OF NEW YORK, Albany, NY (US); YALE UNIVERSITY, New Haven, CT (US)

(72) Inventors: Michael Dapolito, Port Jefferson, NY (US); Mengkun Liu, Stony Brook, NY (US); Xinzhong Chen, Maspeth, NY (US); Adrian Gozar, West Haven, CT (US)

(73) Assignees: The Research Foundation for The State University of New York, Albany, NY (US); Yale University, New Haven, CT (US)

( * ) Notice: Subject to any disclaimer, the term of this patent is extended or adjusted under 35 U.S.C. 154(b) by 0 days.

(21) Appl. No.: 18/694,765

(22) PCT Filed: Sep. 22, 2022

(86) PCT No.: PCT/US2022/044311
§ 371 (c)(1),
(2) Date: May 14, 2024

(87) PCT Pub. No.: WO2023/049225
PCT Pub. Date: Mar. 30, 2023

(65) Prior Publication Data
US 2024/0272196 A1    Aug. 15, 2024

Related U.S. Application Data

(60) Provisional application No. 63/246,980, filed on Sep. 22, 2021.

(51) Int. Cl.
    G01Q 10/04        (2010.01)
    G01Q 20/04        (2010.01)
    (Continued)

(52) U.S. Cl.
    CPC .......... G01Q 10/045 (2013.01); G01Q 20/04 (2013.01); G01Q 30/10 (2013.01); G01Q 60/06 (2013.01); G01Q 60/22 (2013.01)

(58) Field of Classification Search
    CPC ...... G01Q 10/045; G01Q 20/04; G01Q 30/10; G01Q 60/06; G01Q 60/22
    See application file for complete search history.

(56) References Cited

U.S. PATENT DOCUMENTS 5,479,024 A    12/1995   Hillner et al.
5,886,532 A    3/1999    Hsu et al.
(Continued)

FOREIGN PATENT DOCUMENTS

CN     111886505 B       3/2024
DE     102014011272 A1   1/2015
(Continued)

OTHER PUBLICATIONS

International Search Report dated Feb. 27, 2023 issued in PCT/US2022/044311.
(Continued)

Primary Examiner — Nicole M Ippolito
(74) Attorney, Agent, or Firm — Scully, Scott, Murphy & Presser, P.C.

(57) ABSTRACT

A scattering-type scanning near-field optical microscope at cryogenic temperatures (cryo-SNOM) configured with Akiyama probes for studying low energy excitations in quantum materials present in high magnetic fields. The s-SNOM is provided with atomic force microscopy (AFM) control, which predominantly utilizes a laser-based detection scheme
(Continued)

for determining the cantilever tapping motion of metal-coated Akiyama probes, where the cantilever tapping motion is detected through a piezoelectric signal. The Akiyama-based cryo-SNOM attains high spatial resolution, good near-field contrast, and is able to perform imaging with a significantly more compact system capable of handling simultaneous demands of vibration isolation, low base temperature, precise nano-positioning, and optical access. Results establish the potential of s-SNOM based on self-sensing piezo-probes, which can easily accommodate near-IR and far-infrared wavelengths and high magnetic fields. Using a tuning fork-based Akiyama probe provides nano-imaging capability at room and low temperatures and is used for near-field photocurrent mapping.

28 Claims, 18 Drawing Sheets

(51) Int. Cl.
  *G01Q 30/10* (2010.01)
  *G01Q 60/06* (2010.01)
  *G01Q 60/22* (2010.01)

(56) References Cited

U.S. PATENT DOCUMENTS

| | | | |
|---|---|---|---|
| 6,094,971 | A | 8/2000 | Edwards et al. |
| 6,211,988 | B1 | 4/2001 | Engelhardt et al. |
| 6,911,646 | B1 | 6/2005 | Weitekamp |
| 8,793,811 | B1 | 7/2014 | Prater et al. |
| 9,658,247 | B2 | 5/2017 | Yang et al. |
| 10,969,405 | B2 | 4/2021 | Shetty et al. |
| 2002/0162947 | A1 | 11/2002 | Weitekamp et al. |
| 2004/0089816 | A1 | 5/2004 | Quake et al. |
| 2006/0033024 | A1 | 2/2006 | Sparks et al. |
| 2007/0024295 | A1 | 2/2007 | Humphris et al. |
| 2007/0107502 | A1 | 5/2007 | Degertekin |
| 2007/0144244 | A1 | 6/2007 | Ray |
| 2007/0152144 | A1 | 7/2007 | Quake et al. |
| 2007/0194225 | A1 | 8/2007 | Zorn |
| 2007/0210677 | A1* | 9/2007 | Larson ............ B01L 3/0268 310/338 |
| 2007/0295064 | A1 | 12/2007 | Degertekin et al. |
| 2011/0170108 | A1 | 7/2011 | Degertekin |
| 2013/0276174 | A1 | 10/2013 | Li et al. |
| 2013/0278937 | A1 | 10/2013 | Degertekin |
| 2013/0333077 | A1 | 12/2013 | Murdick et al. |
| 2016/0003868 | A1 | 1/2016 | Prater |
| 2017/0219622 | A1 | 8/2017 | Yang et al. |
| 2018/0052186 | A1 | 2/2018 | Su et al. |
| 2018/0259553 | A1 | 9/2018 | Yang et al. |
| 2021/0278435 | A1 | 9/2021 | Zalevsky et al. |
| 2021/0402472 | A1* | 12/2021 | Evans ................ B22F 1/07 |

FOREIGN PATENT DOCUMENTS

| | | |
|---|---|---|
| EP | 1899107 A2 | 3/2008 |
| EP | 3176589 A1 | 6/2017 |
| IN | 2006DN00233 A | 8/2007 |
| IN | 238184 B | 1/2010 |
| KR | 20110041459 A | 4/2011 |
| KR | 20150033673 A | 4/2015 |
| KR | 101915333 B1 | 11/2018 |
| KR | 20200006590 A | 1/2020 |
| WO | 1995003561 A1 | 2/1995 |
| WO | 1996005531 A1 | 2/1996 |
| WO | 1998058288 A1 | 12/1998 |
| WO | 2006138697 A2 | 12/2006 |
| WO | 2007078979 A2 | 7/2007 |
| WO | 2008052065 A2 | 5/2008 |
| WO | 2018144145 A1 | 8/2018 |
| WO | 2022026253 A1 | 2/2022 |
| WO | 2023150264 A1 | 8/2023 |

OTHER PUBLICATIONS

Written Opinion dated Feb. 27, 2023 issued in PCT/US2022/044311.

Yang, Honghua U. et al., "A cryogenic scattering-type scanning near-field optical microscope", Review of Scientific Instruments 84, (Feb. 1, 2013), pp. 023701-1-023701-6.

Akiyama et al., "Symmetrically arranged quartz tuning fork with soft cantilever for intermittent contact mode atomic force microscopy", Review of scientific instruments 74.1 (Jan. 16, 2003), pp. 112-117.

Rogers, B., et al., "Improving tapping mode atomic force microscopy with piezoelectric cantilevers", Ultramicroscopy 100 (Aug. 1, 2004), pp. 267-276.

Fei, Z. et al., "Electronic and plasmonic phenomena at graphene grain boundaries", Nature nanotechnology 8 (Oct. 13, 2013), pp. 821-825.

Adams et al., "Self-sensing tapping mode atomic force microscopy", Sensors and Actuators A Physical 121 (May 31, 2005), pp. 262-266.

Dapolito, Michael et al., "Scattering-type scanning near-field optical microscopy with Akiyama piezo-probes", Applied Physics Letters 120 (Jan. 5, 2022), pp. 013104-1-013104-6.

* cited by examiner

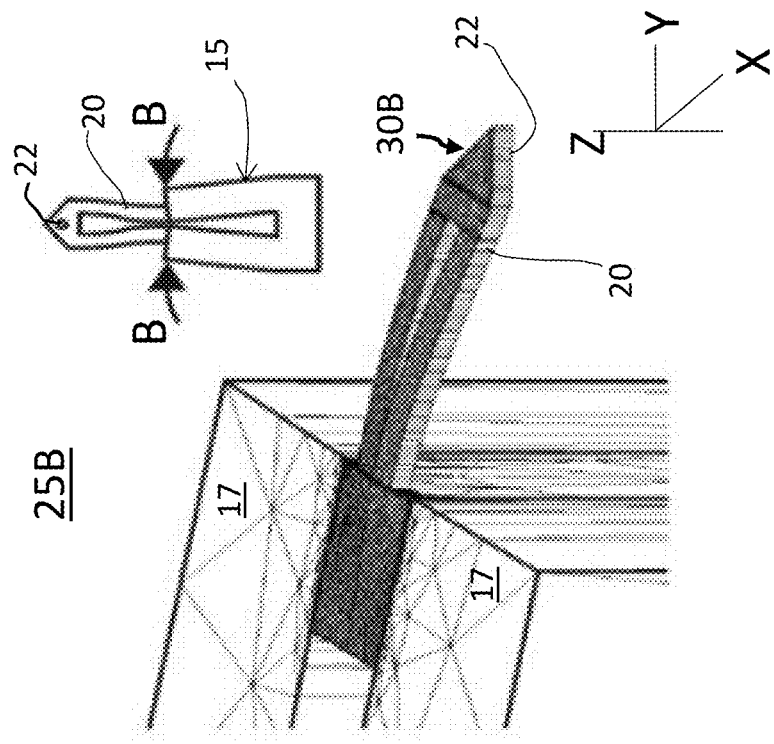
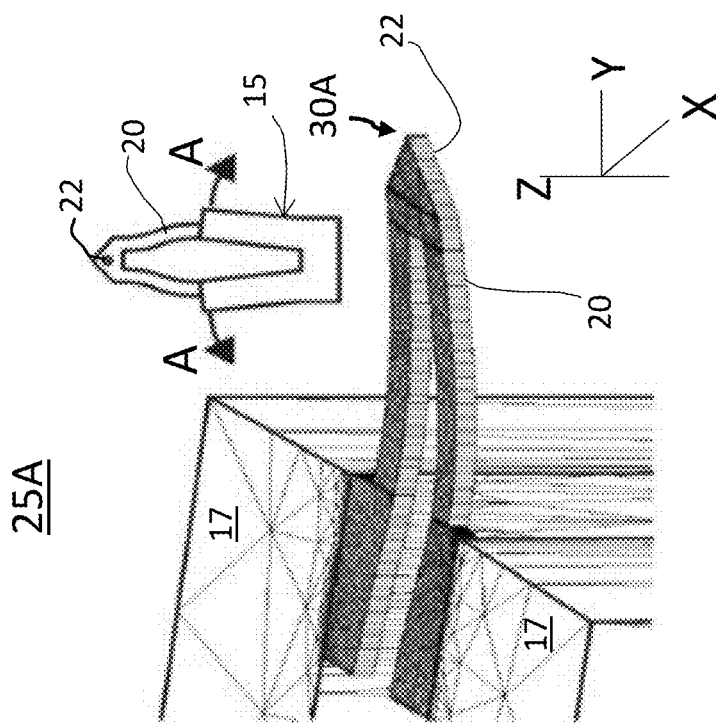
Fig. 2A
Fig. 2B

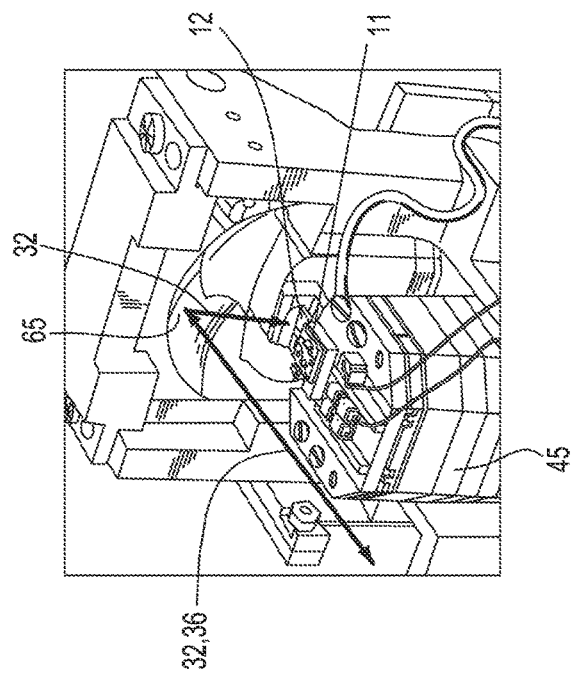
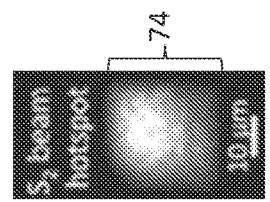
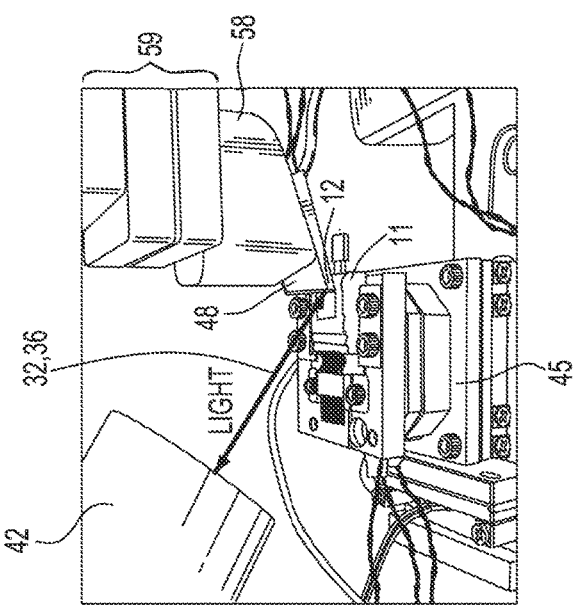
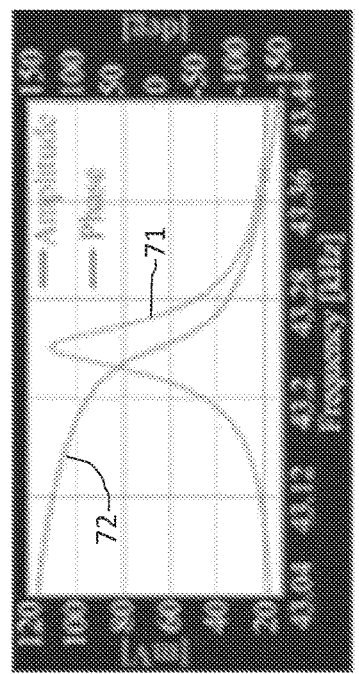
Fig. 3A
Fig. 3B
Fig. 3C
Fig. 3D

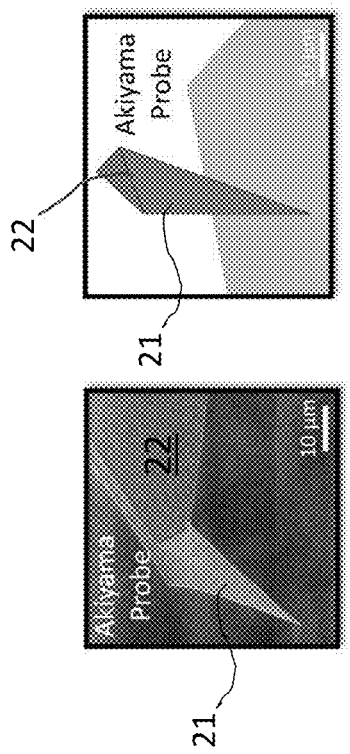
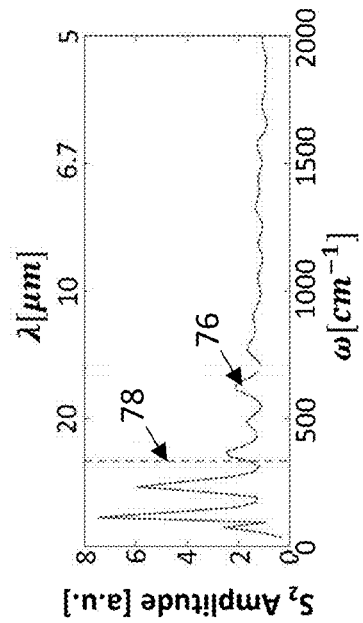
Fig. 5A Fig. 5B Fig. 5C

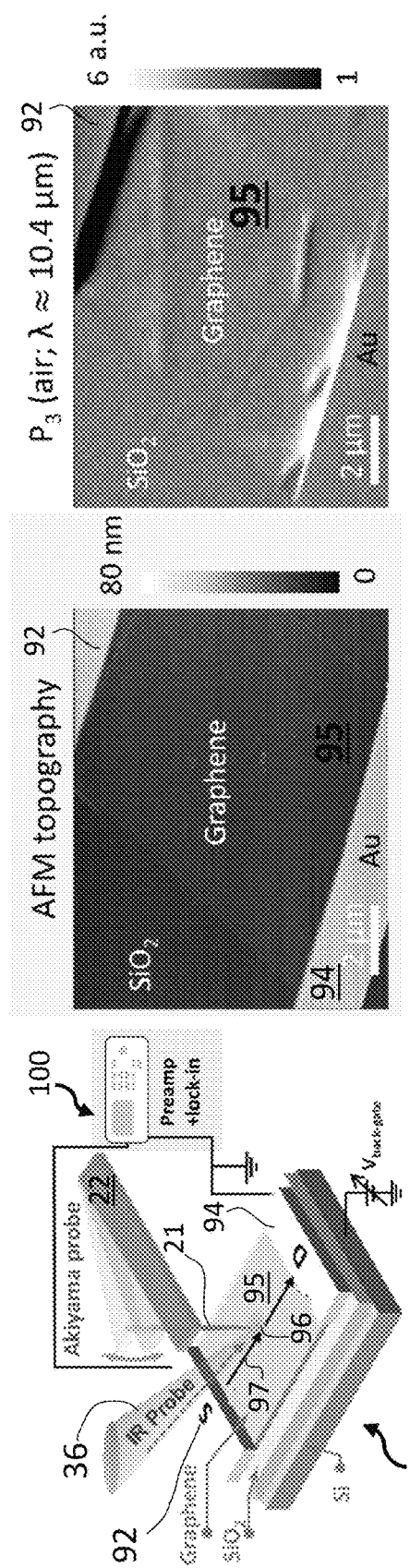
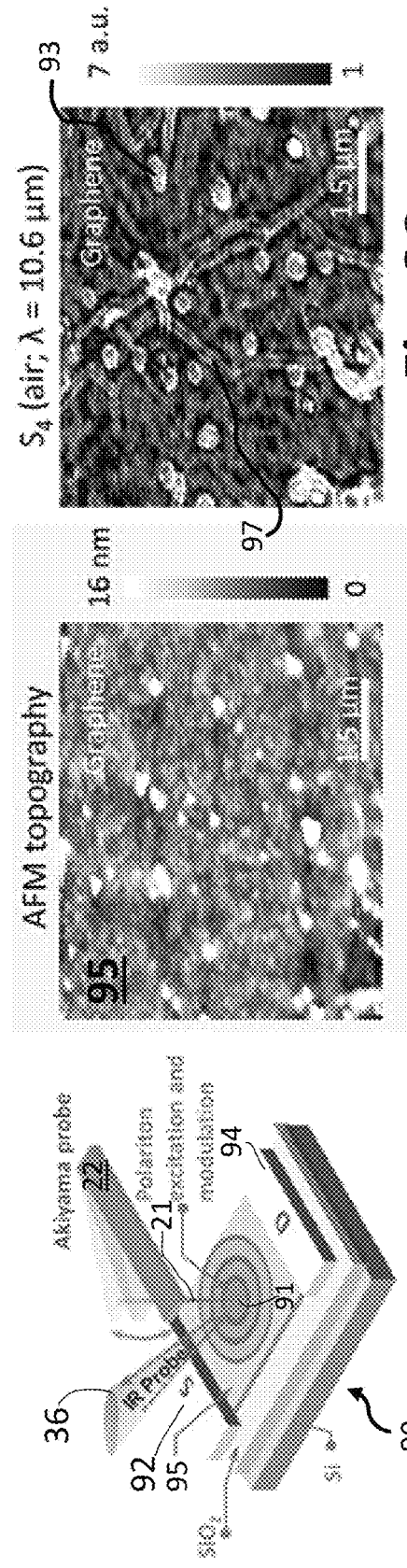

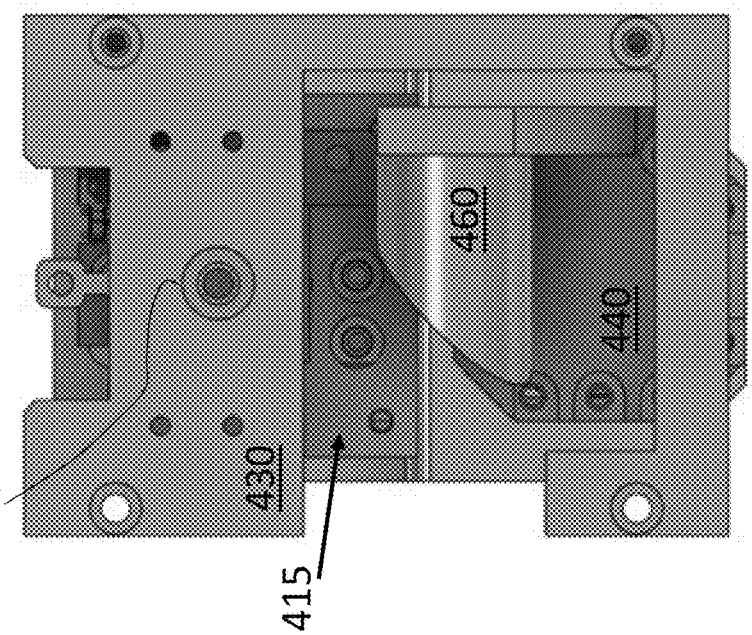
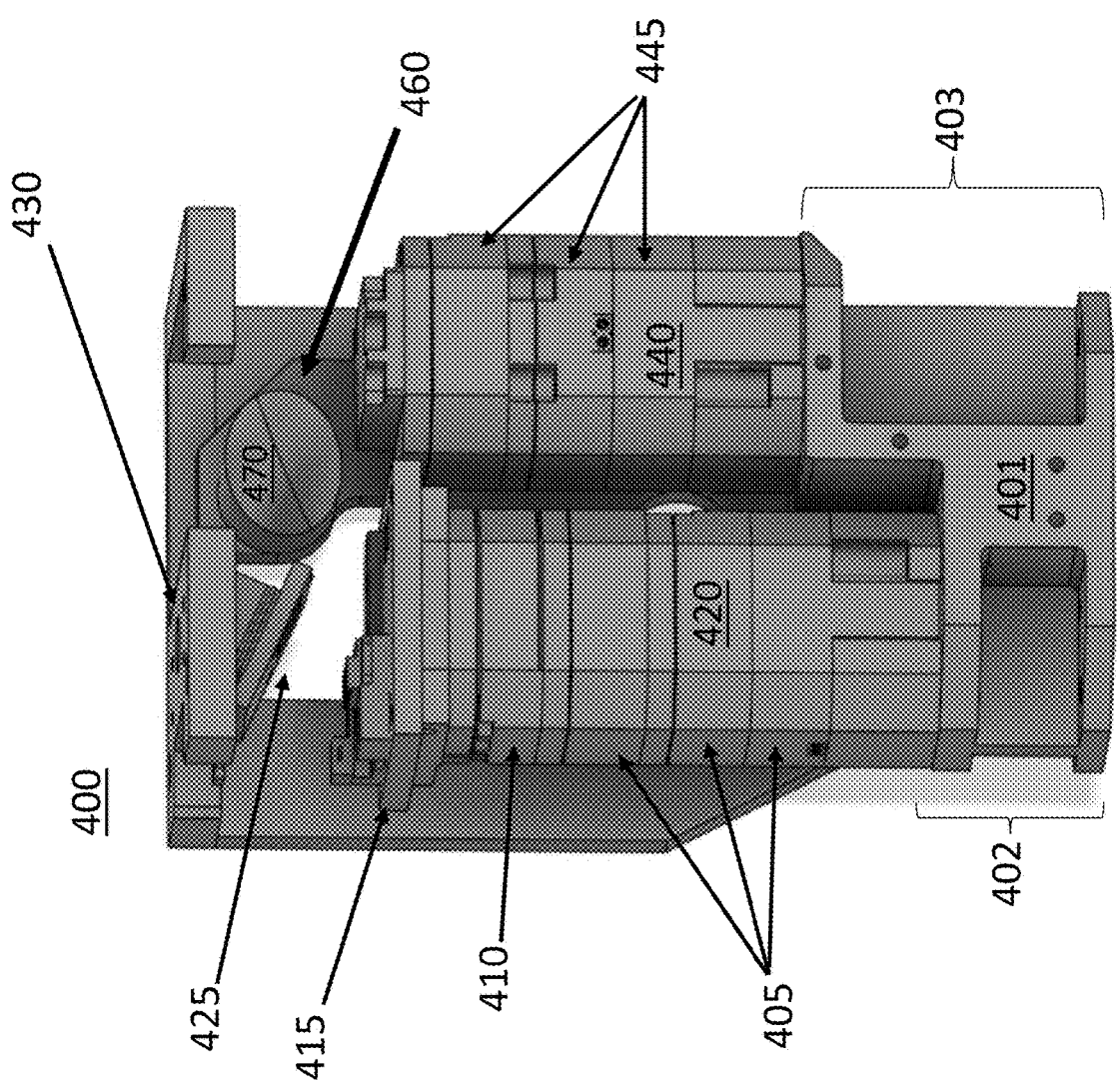

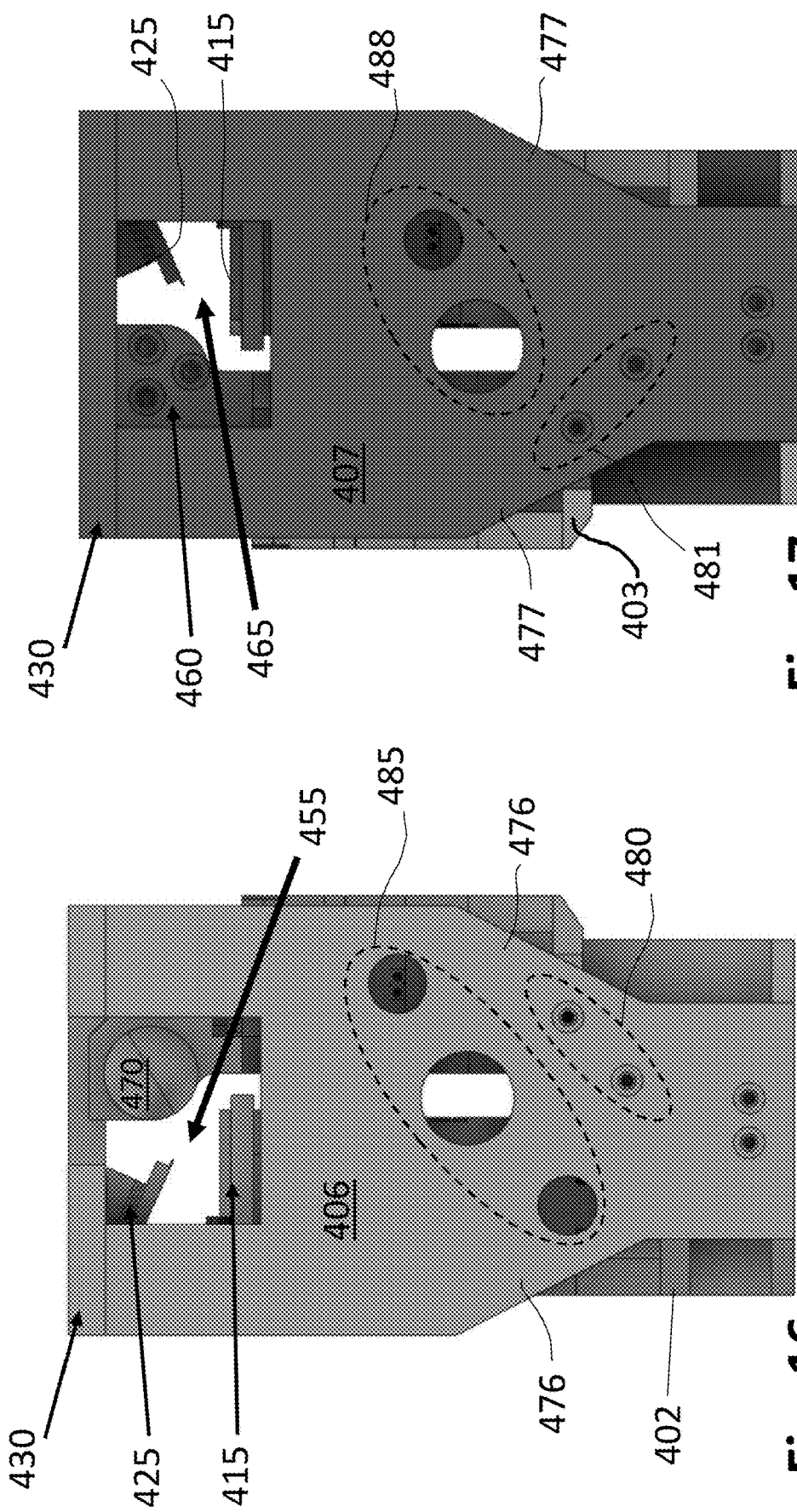

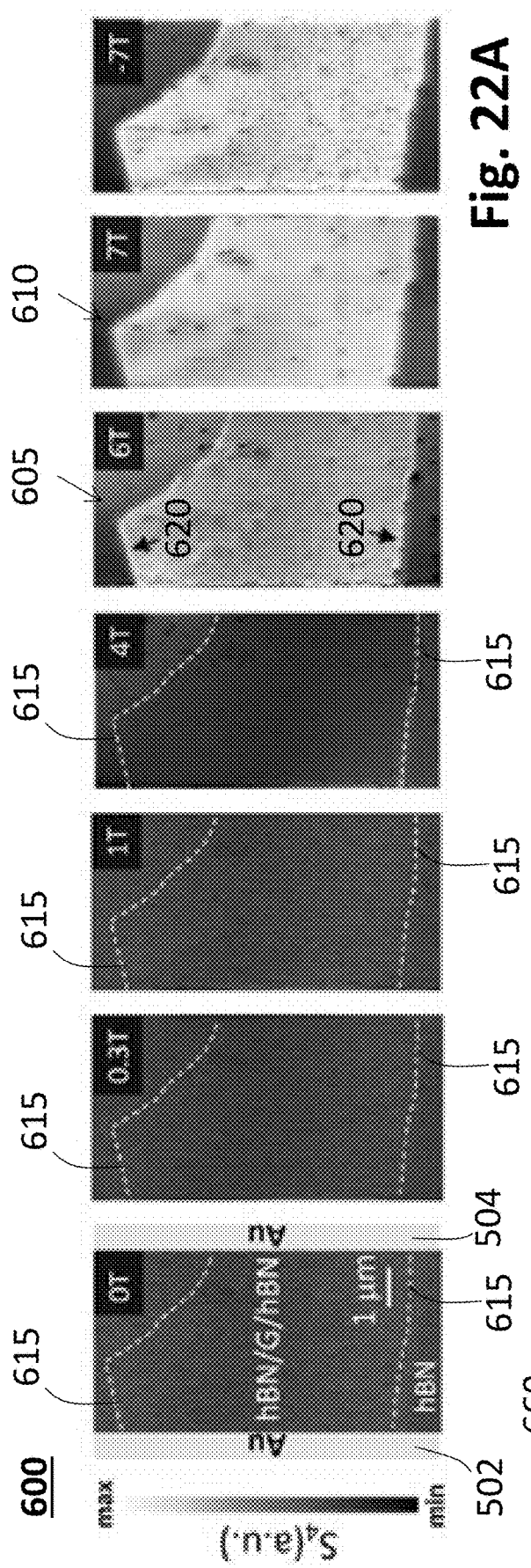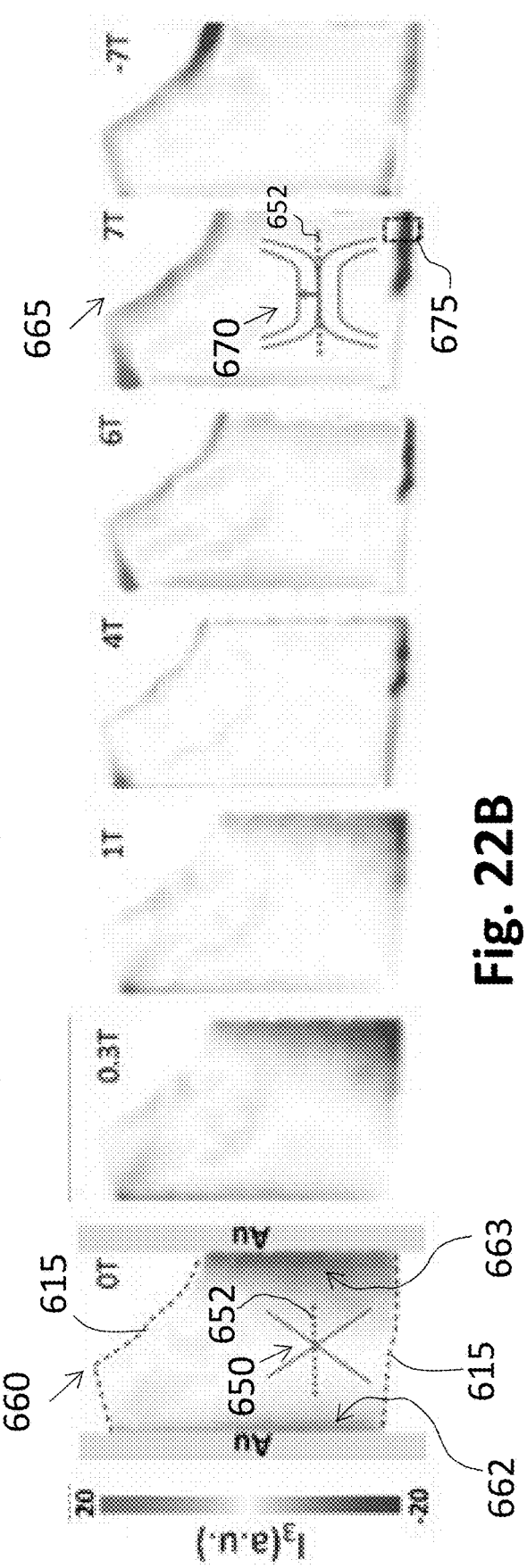
Fig. 22A
Fig. 22B

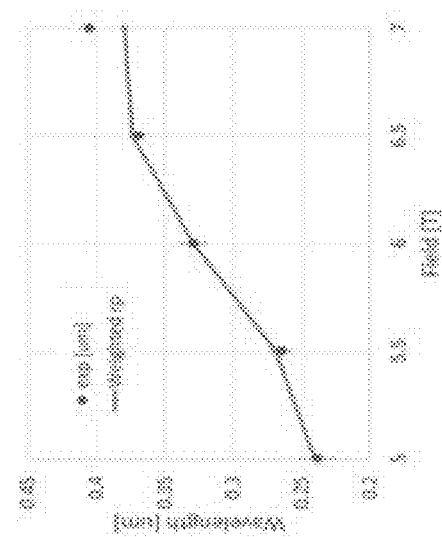
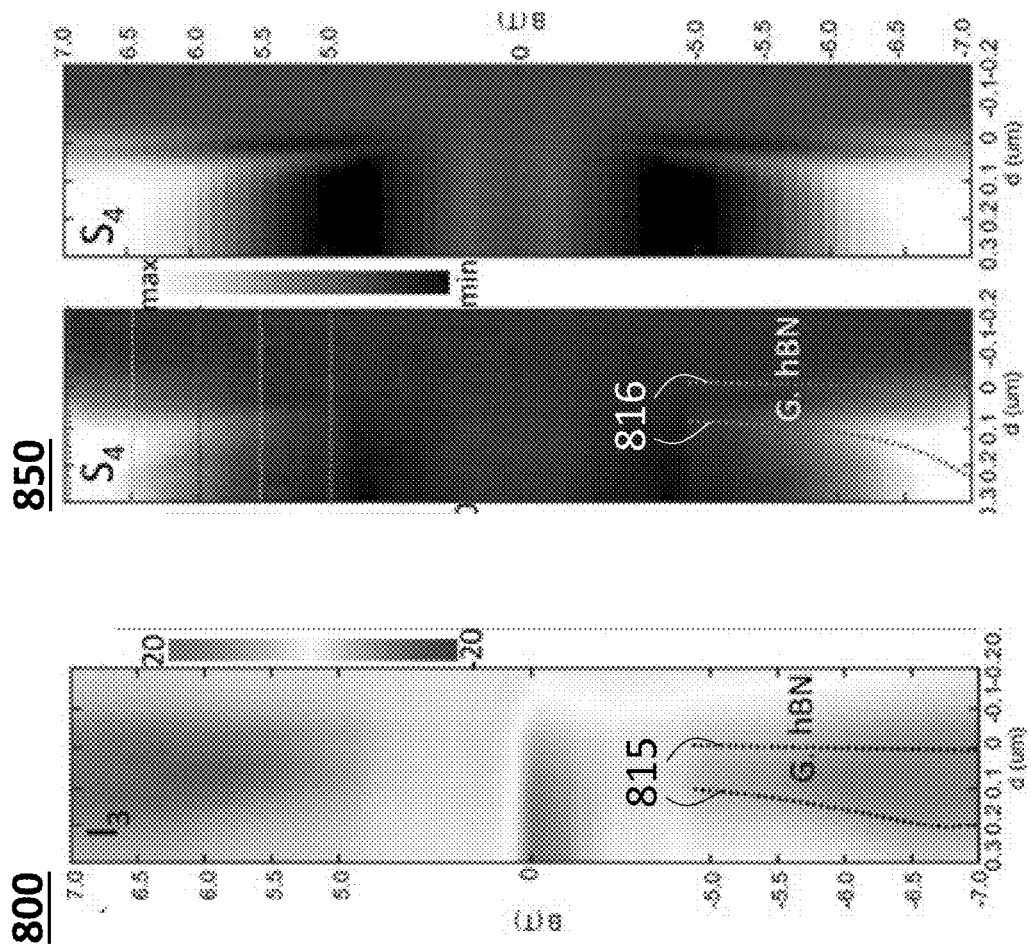
Fig. 24A  Fig. 24B  Fig. 24C  Fig. 24D

SCATTERING-TYPE SCANNING NEAR-FIELD OPTICAL MICROSCOPY WITH AKIYAMA PIEZO-PROBES

CROSS-REFERENCE TO RELATED APPLICATION

This application claims the benefit of and priority to U.S. Provisional Application Ser. No. 63/246,980 filed on Sep. 22, 2021, the entirety of which is incorporated by reference.

BACKGROUND

Imaging a sample using conventional microscopy techniques relies on the collection of far-field light that has been scattered off the sample. The finest features of a material that can be observed using these techniques are limited by the far-field diffraction limit, which is approximately half of the incident light wavelength in free space. The scattering-type scanning near-field optical microscopy (s-SNOM), on the other hand, relies on collecting light that has been scattered by a probing tip in the immediate vicinity of the sample. This enables the imaging of materials on a scale far below the diffraction limit.

Over the past two decades, s-SNOM imaging at ambient conditions has led to a plethora of scientifically important discoveries. However, fundamentally interesting physics often occurs exclusively at cryogenic temperature and sometimes with external stimuli such as magnetic field. The reason why constructing a cryogenic s-SNOM apparatus that is also compatible with tunable external magnetic field remains a challenging task is multi-fold: first of all, the apparatus requires simultaneous accommodation of three essential components in a limited space: 1) the sample stage including scanners, positioners, and optical access for sample/device observation, 2) focusing optics and clear pathways for the incident/scattered light used for near-field imaging, with frequencies from near-infrared (near-IR) all the way to far-IR and THz ranges, and 3) an oscillating tip operated in tapping mode, which so far has been predominantly based on laser-based feedback for a cantilever that is not self-sensing. With these components, one must maneuver several independently adjustable parts: the tip, the sample, and the steering optics for the incident light are individually controlled using micro-precision positioners. This often yields a large footprint for the instrument.

The second challenge is that the cooling power must overcome the enhanced radiative heating due to the incident light and the environmental thermal radiation that enters through the windows needed for light coupling in the cryogenic chamber. The large number of mechanical and optical parts further adds to the mass that needs to be cooled, which impacts the base operating temperatures.

The third important challenge is achieving control of the quality factor of the tip. This value tends to be high in vacuum and at cryogenic temperature, preventing the use of a stable feedback based on amplitude modulation.

SUMMARY

The present disclosure relates to a piezo-based probe scattering-type scanning near-field optical microscope (s-SNOM) system operable at room temperature, a cryogenic piezo-based probe s-SNOM system and a piezo-based probe s-SNOM system for use in cryogenic temps and magnetic fields that addresses the above-challenges.

In an embodiment, instead of using cantilever-based AFM probes, where tip oscillation is detected by a laser, a system and method are provided that uses a novel type of piezo-based AFM probe, where the tip is actuated and detected solely by electrical means or a combination of mechanical excitation and electrical detection. The system and method include the piezo-based AFM method with a near-field microscope, providing a novel cryo-SNOM system that remedies the first two challenges mentioned above.

In one aspect, there is provided a s-SNOM for use at room temperature or cryogenic temperatures using self-sensing and self-actuating AFM probes such as the self-sensing Akiyama probe (A-probe). The A-probe is constructed from a piezo-electric tuning-fork with a sharp micromachined Si cantilever glued to its prongs and renders a compact and stable tip with a relatively soft spring constant that can be excited either electrically or mechanically.

In an embodiment, there is provided an apparatus capable of performing s-SNOM imaging and near-field photocurrent measurements with high spatial resolution and a good signal-to-noise ratio (S/N).

In one aspect, there is provided an apparatus for detecting the optical properties of a sample. The apparatus comprises: a s-SNOM having a self-sensing piezo-electric based probe having a cantilevered probe tip for probing the sample, the self-sensing piezo-electric based probe being driven using an electric signal; a system for applying coherent light upon a sample being probed by the tuned self-sensing piezo-electric based probe, the self-sensing piezo-electric probe generating a modified electrical signal responsive a topography of the sample being probed; and a detector for imaging an optical property of the sample based on a coherent light-sample interaction in the near-field regime of the cantilevered probe tip interacting with the sample.

In an embodiment, the applied electrical signal defines a cantilever tapping frequency and amplitude for tuning the self-sensing piezo-electric based probe.

Further, there is provided a processor circuit operable for controlling the electrical signal applied to the self-sensing piezo-electric based probe, the processor circuit is further adapted to measure an optical property based on the modified electrical signal generated by the probe interacting with said sample.

In an embodiment, the self-sensing piezo-electric based probe comprises a tuning fork element adapted for oscillatory motion responsive to the driving electrical signal, wherein the cantilevered probe tip is attached to the tuning fork element, and the tuning fork element is adapted for translating a motion of the probe tip in a direction orthogonal to the oscillatory motion of the tuning fork element.

According to a further aspect, there is provided an apparatus for performing s-SNOM at cryogenic temperatures and in high magnetic fields. The apparatus comprises: a scattering-type scanning field near-field optical microscope having a self-sensing piezo-electric based probe having a cantilevered probe tip for probing the sample, the self-sensing piezo-electric based probe being tuned using an electric signal; a first system for applying coherent light upon a sample being probed by the self-sensing piezo-electric based probe, the self-sensing piezo-electric probe generating a modified electrical signal responsive to the topography of the sample being probed; a second system for applying a magnetic field to the sample; and an interferometer and detector for measuring optical properties of the sample based on light-sample interactions in the near-field regime of the cantilevered probe tip interacting with the sample.

According to this further aspect, the apparatus is adapted for implementation in a cryostat providing an environment for low temperatures and high magnetic fields, the apparatus being compacted for mounting within the cryostat chamber.

In this embodiment, the detector is further configured for measuring a nanoscale level photocurrent at a near field regime generated at a sample structure responsive to the applied coherent light and applied magnetic field.

Further, the sample structure is a semiconductor device including a pair of contact electrodes, each electrode defining an edge, and a processor circuit being configured to map a plasmon excitation at the defined edge of the graphene heterostructure and its associated nanoscale level edge photocurrent. In particular, the apparatus using the self-sensing piezo-electric probe is configurable to measure near-field photocurrent attributable to tip-induced thermoelectric, thermovoltaic, or photovoltaic effects down to 20 nm length scale. Photocurrent measurements at low temperature and 7 T magnetic field are demonstrated in a graphene device sample. One canonical example demonstrated is the plasmon excitation at the defined edge of the graphene heterostructure and its associated nanoscale level edge photocurrent.

In a further embodiment, the semiconductor device is near-charge neutral, the detector being configured for visualizing plasmon polaritons responsive to quantum transitions occurring in the near-charge neutral semiconductor device structure.

In a further embodiment, the apparatus further comprises: a sample platform for mounting the sample for a probing operation; a first positioning system operatively connected to the sample platform for orienting the sample platform mounting the sample in three dimensions; and a scanning device operatively connected to the sample platform for moving the sample platform in two dimensions during a probing operation; and further comprises a second positioning device operatively connected to one of a focusing lens or a parabolic mirror for positioning the focusing lens or the parabolic mirror in three dimensions for focusing the coherent light upon the sample.

The apparatus further comprises: a self-contained unit adapted for mounting within the cryostat vacuum chamber. The self-contained unit comprises: a first vessel structure for enclosing the first positioning system and for enclosing the scanning device, the sample platform being located above the first vessel; a first mounting structure for mounting the probe tip of the self-sensing optical detection device above the sample platform; a second vessel structure for enclosing the second positioning system; a second mounting structure for mounting the one of the parabolic lens or parabolic mirror, the self-sensing optical detection device above the second vessel in proximity to the sample platform.

The self-contained unit is adapted for placement within a pod mountable within the cryostat chamber, the pod defining a three-dimensional space for receiving the self-contained unit.

The apparatuses described herein provide for the achieving s-SNOM at extreme conditions (e.g., sub-K, magnetic field, or far-IR) whether designed for room temperature, or cryostat temperatures that can work down to T=4 K.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 2A and 2B depict respective z-motion translations of the A-probe cantilever responsive to the in-plane motion of the probe tuning fork;

FIGS. 3A and 3B each show an actual image of the RT s-SNOM and LT cryo-SNOM systems, respectively;

FIG. 3C depicts resonance curves for both frequency and phase generated by sweeping the frequency of the excitation voltage of the Akiyama probe;

FIG. 3D depicts a focused beam hotspot obtained by the detector in an embodiment;

FIG. 5A depicts a scanning electron microscope image of an exemplary geometry of a tip shank of the A-probe tip design in an embodiment;

FIG. 5B depicts a tip geometry model constructed according to the SEM probe-tip image as shown in FIG. 5A;

FIG. 5C shows the amplitude of the scattered field spectra demodulated at a second harmonic ($S_2$) when the probe-tip is placed on top of a metallic surface;

FIG. 7A depicts an example case study of a near-field photocurrent measurement using the RT setup of FIG. 1A;

FIG. 7B shows the AFM topography and FIG. 7C shows the detected third harmonic signal $P_3$ resulting from the example case study of FIG. 7A;

FIGS. 8A-8C depict a second case study with FIG. 8B demonstrating AFM topography and FIG. 8C demonstrating the detected fourth harmonic $S_4$ image;

FIG. 12 depicts a self-contained non-magnetic housing unit for enclosing the cryo-SNOM system of FIG. 1B minus the interferometer;

FIG. 15 depicts a top view of the s-SNOM system enclosure including the top plate and showing the opening for enabling visualization of the sample and A-probe tip;

FIG. 16 shows a front view of the self-contained housing unit including the front wall attached to the base plate portion;

FIG. 17 shows a back view of the self-contained housing unit including the back wall attached to the top plate and attached to the base plate portion;

FIGS. 22A and 22B depict results of magnetic field tuning of the $0^{th}$ to $1^{st}$ Landau Level transition in a near-charge neutral graphene as revealed by m-SNOM shown in successive images (FIG. 22A) and as corresponding near field photocurrent imaging (FIG. 22B);

FIGS. 24A and 24B show exemplary magnetic field-dependent Landau plasmon dispersion results of the photocurrents (FIG. 24A) and results of the s-SNOM line scans (FIG. 24B) at the graphene-hBN boundary while sweeping the magnetic field;

FIG. 24C shows a simulated s-SNOM mapping of the magnetic field plasmon dispersion using the same parameters as the ones in FIGS. 23A-23C; and FIG. 24D depicts a plot of plasmon wavelength, $\lambda_p$, as a function of the magnetic field, showing strong agreement between the simulation and experiment.

DETAILED DESCRIPTION

Figure 1A:
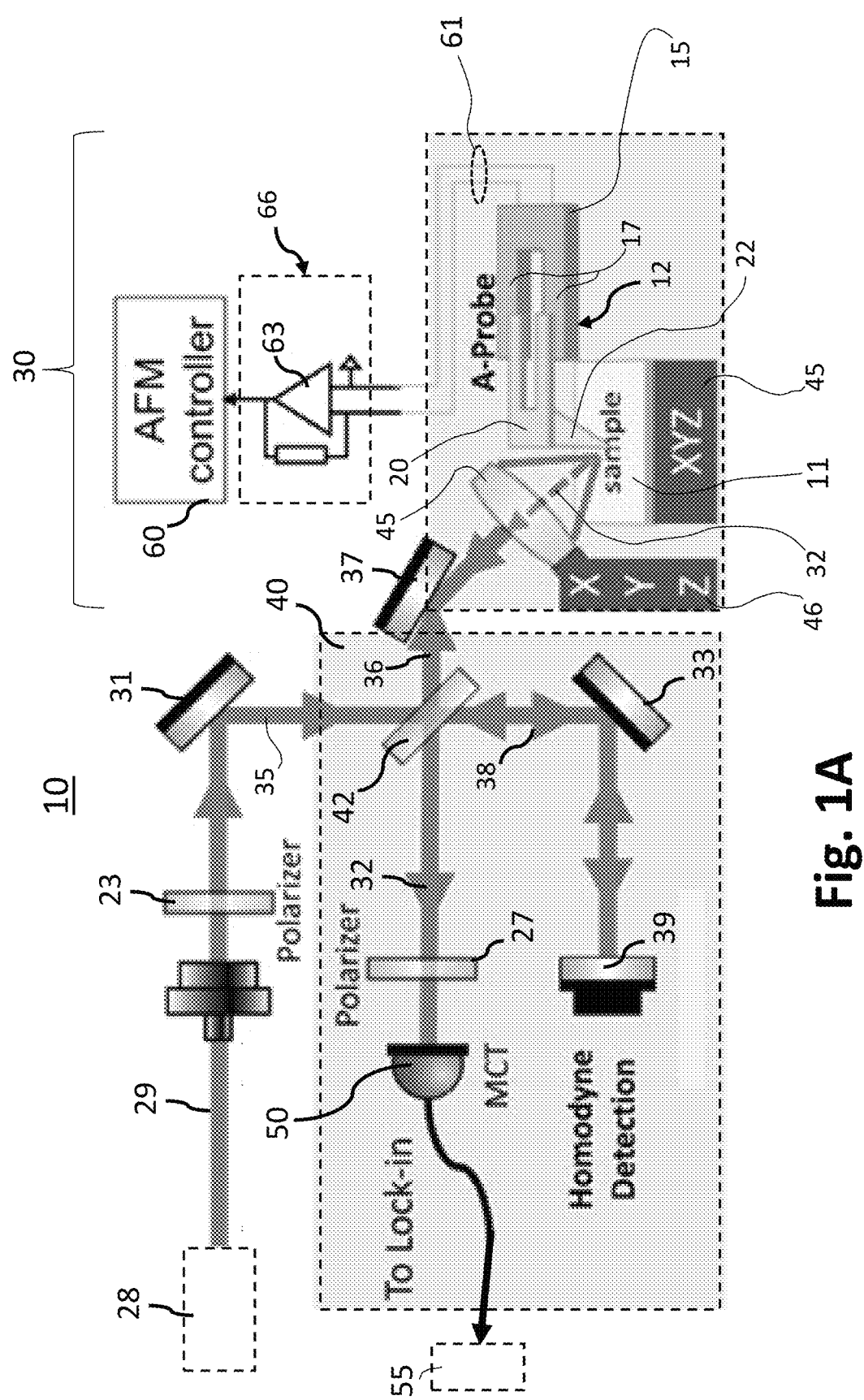
FIGS. 1A and 1B depict a respective apparatus for Akiyama probe-based s-SNOM for use at room temperature (RT) (FIG. 1A) and for use at cryogenic (low) temperatures (LT) (FIG. 1B) in embodiments herein.

The present disclosure relates to scattering-type scanning near-field optical microscope for use at cryogenic temperatures (cryogenic s-SNOM or cryo-SNOM).

In one embodiment, there is provided a cryogenic s-SNOM or cryo-SNOM suitable for use in systems for studying low energy excitations in quantum materials. The use of a cryo-SNOM according to embodiments herein can meet the simultaneous demands such as: vibration isolation, low base temperature, precise nano-positioning, and optical access involved in such studies.

The cryo-SNOM in the embodiments herein use gold-coated Akiyama probes ("A-probes") available from Nano-AndMore USA Corp., where the cantilever tapping motion is detected through a piezoelectric signal. This configuration of an Akiyama-probe-based cryo-SNOM attains high spatial resolution, good near-field contrast, and is able to perform imaging with a significantly more compact system compared to other cryo-SNOM techniques. Measurement results firmly establish the potential of s-SNOM based on self-sensing piezo-probes, which can easily accommodate far-infrared wavelengths and high magnetic fields. Use in magnetic fields of up to 7 Tesla (T) has been demonstrated and the Akiyama-tip is good for up to 12 T. While use in a low temperatures environment of 18° K with a base temperature of 1.7° K has been demonstrated, the embodiments herein can be used in environments below 100 mK.

As defined herein, near-field imaging refers to imaging of a sample surface in the proximity of, such as under, the AFM tip at such a region where the tip interacts with the sample. Performing near-field imaging relies on being able to enhance and scatter the near field at the sample surface such that sufficient contrast for features with differing optical properties can be obtained.

Further, as referred to herein, near-field photocurrent measurements refer to the focusing of light upon the sample surface and obtaining current generated by the tip-focused light through electrodes patterned on the sample surface.

Further, as referred to herein, self-sensing, or self-actuating tip in the context of an s-SNOM apparatus refers to the ability to obtain a topographic property of a sample using a piezo-electric cantilevered probe tip including a tuning fork, wherein a probing is accomplished without using an optical signal (light) but rather using an electrical signal to read and excite the piezoelectric tip. In an embodiment herein, this is accomplished with a cantilevered piezo-electric probe tip, an Akiyama-probe or "A-probe" where a laser focused onto the tip results in a charge distribution induced across the tip, which leads to an enhanced near-field directly under the tip. This near-field enhancement can be understood by the point-dipole model, where the tip is approximated as a polarizable sphere in an electric field.

A self-probing tip refers to the ability of a piezo-electric cantilevered probe tip including a tuning fork where the cantilevered probe tip is for probing the vibration of the amplitude of the tip by measuring the electrical signal rather than an optical signal wherein as the amplitude of the tip changes a voltage that is generated in the tuning fork and that voltage is proportional to the tapping amplitude.

Further, as referred to herein, a cryostat is a device used to maintain low temperatures of samples or devices mounted inside it.

Figure 1B:
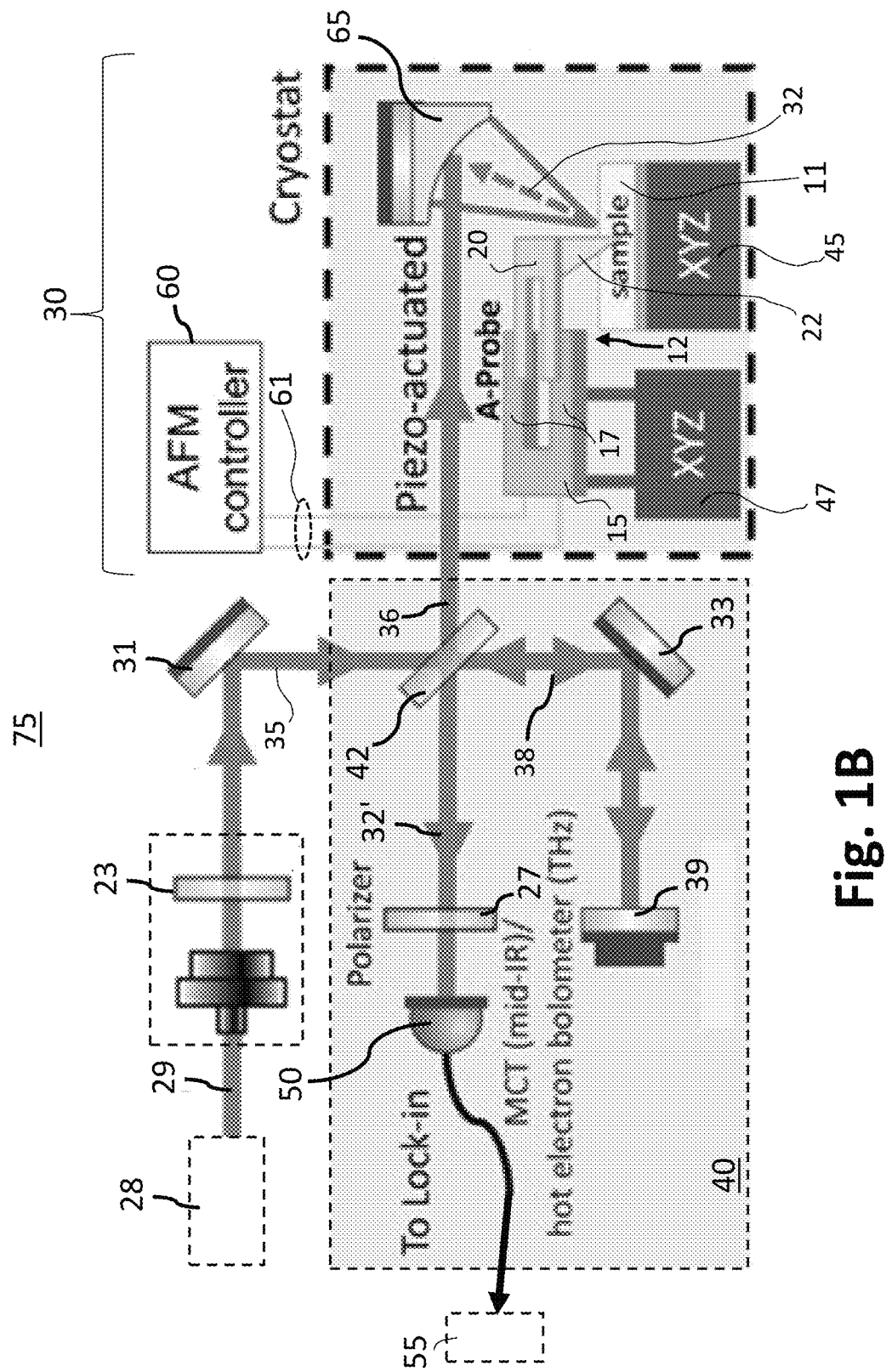

FIGS. 1A and 1B depict respective embodiments of a scattering-type scanning near-field optical microscope apparatus that include an Akiyama probe. The Akiyama probe-based s-SNOM apparatus 10 such as the one shown in FIG. 1A is configurable for use at room temperature (RT) and, as shown in FIG. 1B, the Akiyama probe-based s-SNOM apparatus 75 is configured for use at cryogenic (low) temperatures (LT).

As shown in FIGS. 1A and 1B, the scattering-type scanning near-field optical microscope apparatus 10, for use at respective room temperature or low temperature, includes an Akiyama probe 12. The A-probe is constructed from a piezoelectric material (e.g., quartz) tuning-fork 15 with a sharp micromachined Si cantilever 20 glued to its prongs 17 that includes a high-end sharp silicon tip 22. This combination renders a compact and stable tip with a relatively soft spring constant (~5 N/m, orders of magnitude smaller compared to bare tuning forks) that can be excited either electrically or mechanically. With the A-probes, a room temperature and cryogenic s-SNOM system can be built that is more compact and simpler to use than traditional systems. The resulting apparatus is capable of performing s-SNOM imaging and near-field photocurrent measurements with high spatial resolution and a good signal-to-noise ratio (S/N). In an embodiment, the length of the A-probe is about 28 μm, and the A-probe's Si tip radius can range from between 10-15 nm.

As an alternative to cantilever-based AFM, a tungsten wire (not shown) can be attached to the tuning fork 15 to realize a piezo-probe. However, good mechanical coupling and substantial shaking power are required to achieve a tapping amplitude, e.g., of 50-100 nm, which is usually required to effectively modulate the near-field interaction.

As shown in FIG. 1A, the apparatus 10 includes two main components: an atomic force microscope (AFM) platform 30, and an asymmetric optical interferometer 40. The AFM 30 provides a platform for probing the light interaction with the sample 11 (light-sample interaction) in the near-field regime. In this manner, using focused light at the A-probe tip 22, the s-SNOM can not only probe the sample topography, but also the optical properties of the sample at the nanoscale. By focusing a laser beam onto the AFM tip, the apparatus collects the light scattered off the tip which encodes the local optical properties of the sample 11. The Michelson interferometer 40 enables phase-sensitive detection of the scattered near-field signal. To suppress the background scattering off the tip shank and sample surface, the tip 20 is operated in tapping mode, oscillating harmonically close to its mechanical resonance frequency. The detected scattered signal is demodulated at higher harmonics of the tip tapping frequency to filter out any undesired far-field background.

In the AFM platform 30 of FIG. 1A (and FIG. 1B), all s-SNOM image sampling operations employ two electrical connections 61 to the A-probe tuning fork via a Printed Circuit Board (PCB) (not shown) upon which the A-probe 12 is mounted. As shown in the configuration of the apparatus 10 for LT optical image sampling shown in FIG. 1A, one of the electrical connections 61 connects to an AFM controller 60 through drive circuitry 66 including, but not limited to: pre-amplifier circuits, oscillator circuit/electronics for self-oscillation, and a phase-locked-loop (not shown). This drive circuitry 66 can provide a drive signal (i.e., an oscillating voltage signal at a particular frequency/amplitude) to the A-probe via one of the electrical connections 61 to the tuning fork. In an embodiment, by applying a drive signal to the A-probe 12, which is a cantilever 20 attached to a piezoelectric tuning fork 15, the driving voltage generates in-plane oscillations of the tuning fork prongs 17, which translates to out-of-plane z-axis motion for the cantilever. For example, as described in the reference to Akiyama et al. entitled "Symmetrically arranged quartz tuning fork with soft cantilever for intermittent contact mode atomic force microscopy", Review of Scientific Instruments 74, 112 (2003), FIG. 2A shows a cantilever tip response 25A to a portion of an applied oscillation signal in which the tuning fork prongs 17 move in respective opposite directions indicated by arrows "A" to generate a first z-axis deflection 30A while FIG. 2B shows a further cantilever tip response 25B to another portion of the applied oscillation signal in which the tuning fork prongs 17 move in respective directions toward each other indicated by arrows "B" to generate a second z-axis deflection 30B. In turn, the tip 22 is brought into contact with the sample, the cantilever deflection translates to mechanical deformation of the tuning fork that generates a piezo voltage proportional to this deflection. This piezo voltage proportional to this deflection can be measured directly from the piezoelectric signal generated by the tuning fork 15 received at preamplifier circuitry 63 using the other of the electrical connections 61.

In an embodiment depicted in both FIGS. 1A and 1B, the asymmetric optical interferometer 40 is a Michelson interferometer that includes a configuration of mirrors 31, 33, 37 and 39, optical filters (polarizers) 23, 27, and includes a beam splitter 42, e.g., a ZnSe beam splitter, that splits the incident light by a specified ratio that is independent of the light's wavelength or polarization state in the IR regime. In an embodiment, the Michelson interferometer 40 is optimized for the mid-IR but can be adapted to be used in the THz frequency range. A coherent light source 28, such as a gas, e.g., $CO_2$, laser source, emits coherent light 29 of a defined wavelength, e.g., 9 µm-11 micrometers, that is coupled via fiber to an in-plane polarizer 23 (functioning as an optical filter to filter out light polarized in a direction not in-plane to the tip) where it becomes polarized parallel to the tip shank 35. The use of polarizer 23 is optional in the cryo-SNOM apparatus 75 of FIG. 1B depending upon the light source used. The polarized light beam 35 is reflected off first mirror 31 to hit the beam splitter 42 surface. The beam splitter 42 is partially reflective and reflects (in the reflection arm) a smaller percentage of the input beam, i.e., beam 36, towards the A-probe tip, and transmits a majority of the beam, i.e., beam 38, towards a transmission or reference arm. In a non-limiting embodiment, the beam splitter 42 reflects 40% of the beam towards the A-probe tip 22 and transmits 60% of the beam towards the reference arm. In the reflection arm, the reflected light beam 36 gets focused onto the A-probe tip 22 through an aspherical lens 45 as shown in FIG. 1A. In the embodiment of FIG. 1B, the reflected light 36 gets focused onto the tip through an off-axis parabolic (OAP) mirror 65. Whether an OAP mirror 65 or aspherical lens 45 is used depends on the light source and operating environment/temperature; the OAP mirror 65 has the advantage of being wavelength independent while the aspherical lens 45 provides for easier alignment. The enhanced scattered signal 32 is collected through the same lens 45, in the embodiment of RT apparatus 10 shown in FIG. 1A or is collected via the OAP 65 in the embodiment of LT apparatus 75 shown in FIG. 1B. In each embodiment, this enhanced scattered signal 32 is recombined with the reference arm, and the resulting signal 32' is focused onto a Mercury-Cadmium-Telluride (MCT) detector 50 for homodyne detection thereof. That is, the transmitted light portion 38 through the reference arm that is transmitted through the beam splitter 42 to the mirror 33 is further reflected by a piezo adjustable mirror 39 for homodyne detection with the information from the enhanced scattered light signal 32 reflected from the sample at the AFM 30 through lens 45 (or OAP mirror 65). In an embodiment, the interferometer is used to collect phase information between the incoming reference arm signal and the scattered light from the sample for the optical imaging of the sample. The enhanced scattered light 32' is filtered using polarizer 37 prior to detection by the MCT detector 50 and then sent to a lock-in amplifier to measure the near-field signal. The combined signal is then demodulated at a frequency that is the integer multiple of the tapping frequency of the probe tip to see what optical signal is modulated by the tapping of the tip to capture the genuine near-field region information of the sample.

To perform AFM measurements requires measuring the probe's tapping amplitude and frequency. In the A-probe based systems of FIG. 1A, 1B, the tapping amplitude and frequency are measured directly from the piezoelectric signal generated by the tuning fork 15 since the A-probe is self-sensing. This piezoelectric signal is generated by the tuning fork and received for processing at the AFM controller via connections 61. This eliminates the need for separate optical alignment and detection schemes for the cantilevered tip 22. As shown in RT s-SNOM apparatus of FIG. 1A, the sample 11 is mounted on a micro-precision positioner or scanning platform 45 which can orient a position of the sample in three-dimensions (e.g., XYZ piezo stages) for sample scanning. A focusing lens 45 for focusing the received probe light signal from the interferometer 40 is also mounted on a similar XYZ micro-precision positioning platform or scanning stage 46 that can modify the orientation of the lens 45 in three-dimensions for optical alignment. In the RT s-SNOM apparatus of FIG. 1A, the A-probe (cantilever/tip and tuning fork) is fixed in orientation with respect to the sample 11 and the focusing lens 45 that sits on XYZ piezo stages is adjusted for optically aligning the received light beam 36 to the A-probe tip. Fixing the tip position increases the overall mechanical stability of the A-probe based s-SNOM system. In the LT cryo-SNOM apparatus of FIG. 1B, the A-probe (cantilever/tip and tuning fork) is mounted on XYZ piezo stages 47 and the tip is adjusted for optical alignment with the incident light beam 36. The XYZ piezoelectric stages in each embodiment include a piezoelectric motor driven scanner in a closed loop operation.

Thus, when an AC signal is sent to the piezoelectric tuning fork 17, e.g., quartz, the tuning fork will oscillate and generate an electric signal in response. This allows one to find the resonance frequency of the tuning fork by measuring the electric signal generated as the driving frequency is swept across the resonance. The Akiyama probe is configured to lie perpendicular to the sample surface. The AC signal is transmitted to the tip, and by sweeping the frequency there is found the tuning fork's resonance. Once resonance is found, the driving signal at this frequency is locked using a phase-locked loop (PLL). The tip is then brought into contact with the sample using XYZ piezo stages. Next, a laser is focused onto the tip using either a lens or parabolic mirror for near-field enhancement. The location of the beam spot is then optimized by either scanning the length of the lens with piezo stages or using a visible beam. The light that gets reflected off the tip and sample is collected by the focusing lens or mirror, mixed with the original un-scattered light, and the intensity of the resulting signal is measured by a liquid nitrogen cooled MCT detector.

In operation, p-polarized light 29 from a $CO_2$ laser (e.g., at a wavelength of 10.4 μm) or light from a THz source is coupled via an optic fiber to the Michelson interferometer 40 for homodyne detection of the s-SNOM signal. The reflected light path is focused onto the AFM tip by the lens 42 in the RT S-SNOM apparatus 10 of FIG. 1A. In this embodiment, when the reflected light path 36 is focused onto the AFM tip, the location of the beam spot is optimized by scanning the lens 45 via XYZ piezo stages 46. As the tip scans the sample surface, the tip scattered light 32 is collected, and recombined with the reference arm. The intensity of the resulting signal 32' is measured by liquid nitrogen cooled MCT detectors. This signal 32' is then sent to a lock-in amplifier 55 for demodulation at higher harmonics of the tip tapping frequencies.

In an embodiment, two (2) feedback loops are used to maintain a constant tip-sample distance: frequency and amplitude feedback. Both feedback loops are controlled using an AFM controller 60, e.g., an RHK R9 AFM controller (available from RHK Technology, Inc. Troy, MI) which controls the AFM operations. For frequency feedback, the lock-in amplifier 55 is used to monitor the phase between the tip driving signal and the tip oscillation and keep it at zero degrees. After selecting a desired frequency shift for the tip as it goes into contact with the sample, this feedback loop will maintain this frequency shift as the tip is scanned across the sample surface. Thus, if the tip frequency shifts, the phase difference between the two signals will change and the sample position in the z-direction will be modified. The amplitude feedback loop is used to maintain a constant tapping amplitude by altering the tip driving voltage as the tip is scanned across the sample surface. In general, the AFM controller 60 is used to control the AFM.

FIGS. 3A and 3B each show an actual image of the RT s-SNOM and LT cryo-SNOM systems, respectively.

In FIG. 3A, the close-up image shows the lens 42, sample 11, and A-probe 12 for the room temperature s-SNOM apparatus of FIG. 1A (UHV compatible). In FIG. 3A, arrow labeled 32, 36 indicates the light path through the aspherical lens 42 (the lens passing infrared range light). The sample 11 sits on piezo (XYZ) stages 45 and is scanned to generate an s-SNOM image. The lens 45 sits on a XYZ piezo stage while the probe tip is fixed in place. The A-probe tip in FIG. 3A sits on a PCB 48 which is attached to a wedge block 58. The wedge block 58 can be angled at about 25 degrees, however, can be fixed at an angle 24-degree with respect to a horizontal. The wedge block 58 is held in place by a magnetic mount 59 and does not move throughout a measurement.

In FIG. 3B, the close-up image shows the parabolic mirror 65, sample 11, and A-probe 12 for the cryo-SNOM apparatus of FIG. 1B. In the embodiment of FIG. 3B, the A-probe tip 11 sits on piezo stages 47 while the OAP reflected light beam remains stationary. The sample is scanned to generate an s-SNOM image.

FIG. 3C depicts resonance curves 71, 72 for both frequency and phase, respectively. The resonance curves 71, 72 are generated by sweeping the frequency of the excitation voltage of the Akiyama probe. In an embodiment, to maximize the s-SNOM signal in the RT apparatus 10, the lens 45 is scanned until a beam hotspot 74 of 10 μm in diameter is found such as the focused beam hot spot 74 shown in FIG. 3D obtained by the detector 50 while scanning the lens in a beam alignment procedure.

Figure 3E:
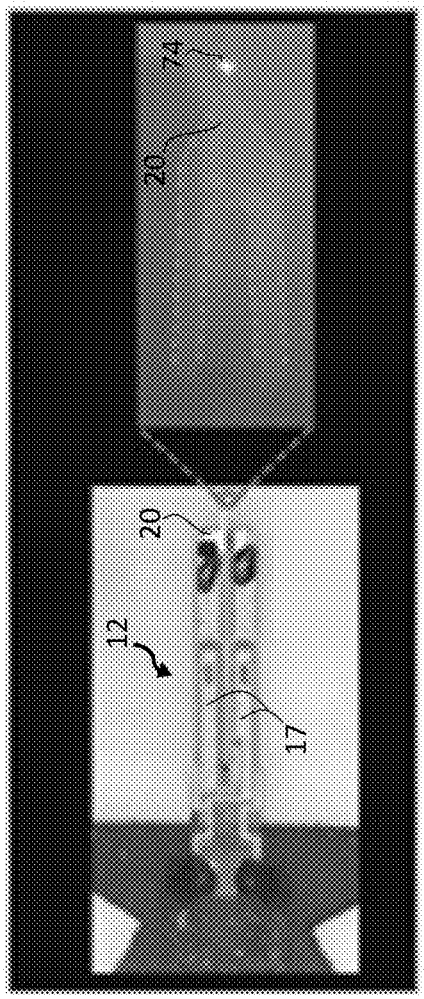
FIG. 3E depicts an image of the Akiyama probe under an optical microscope and of a focused pilot laser HeNe beam spot used to align the probe with the IR beam in an embodiment.
Figure 4:
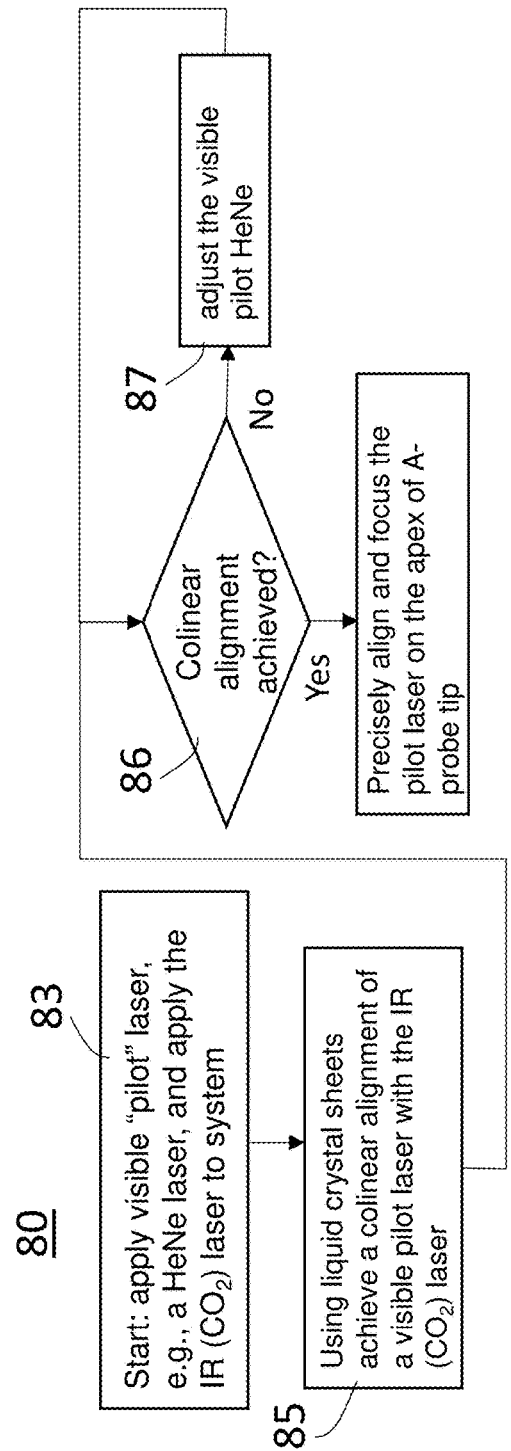
FIG. 4 depicts a beam alignment procedure 80 for aligning the beam hotspot at the A-probe tip in the fixed OAP configuration of the cryo-SNOM apparatus of FIG. 1B.

FIG. 4 depicts a beam alignment procedure 80 for aligning the beam hotspot at the A-probe tip in the fixed OAP configuration of the cryo-SNOM apparatus of FIG. 1B. A first step 83 is applying a visible "pilot" laser, e.g., a HeNe laser, and the IR ($CO_2$) laser beam spot in a vicinity of the A-probe tip. The HeNe laser is used as a guide beam to focus the $CO_2$ laser onto the tip. Then, at 85, using temperature sensitive liquid crystal sheets, the method adjusts the visible pilot HeNe laser to achieve a colinear alignment of a visible pilot laser with the IR ($CO_2$) laser. A determination is made at 86 to determine whether a colinear alignment of the pilot and IR beam is achieved. If colinear alignment is not achieved, the method proceeds to 87 to adjust the visible pilot laser light until colinear alignment is achieved. Once, colinear alignment is achieved, a further step 88 involves precisely aligning and focusing of the pilot laser on the very apex of the A-probe tip 20. To realize this, there is provided a preliminary positioning of the tip 20 in the vicinity of the pilot, as shown in FIG. 3E. In an embodiment, a microscope (not shown) above the cryostat is used to view the tip so that the sample can be brought into contact without crashing the tip and also focus the HeNe spot on the cantilever. This can be done by first focusing on the tip and then defocusing the camera slightly below the tip, allowing the sample to be brought into focus and close to the tip. A second function of a microscope camera is to locate the regions of interest on the sample where it is desired for measurement. The third function is to view the location of the HeNe and its spot size on the cantilever. In particular, FIG. 3E depicts an image of the Akiyama probe 12 under an optical microscope and of a focused pilot laser HeNe beam spot 74 used to align the probe with the IR beam. After preliminarily positioning of the tip 20 in the vicinity of the pilot, this is followed by high resolution direct tip imaging on a CCD camera (not shown) by inserting a flip-mirror in the light collection path after the beam-splitter. This procedure usually allows for the detection of the true near-field signal during a first tip-sample approach. Further improvement in the SNOM signal can be achieved by fine tuning the position of the IR beam.

Referring to FIG. 5A, it is the case that the geometry of the tip shank 21 of the A-probe long (e.g., 28 µm) is longer than conventional AFM probe tip designs. It is well known that the tip-antenna effect is closely related to the tip shank length, therefore, the A-probe exhibits a good near-field scattering signal for longer incident light wavelengths. To verify this, the system first performs a full-wave numerical simulations using the method of moment (MoM) technique. Compared to other full-wave numerical algorithms MoM is especially suitable for such a simulation because only the tip surface needs to be discretized. This offers a monumental advantage in terms of computer memory and computation time.

In an embodiment, an A-probe tip 22 is imaged using a scanning electron microscope (SEM) as shown in FIG. 5A to precisely determine its geometry. Then a tip geometry model is constructed accordingly as shown in FIG. 5B. FIG. 5C shows the amplitude of the scattered field spectra 76 demodulated at the second harmonic ($S_2$) when the tip 22 is placed on top of a metallic surface. The simulation is carried out in a broad frequency range from 1 terahertz (THz) to near-IR. As shown, in the mid- and near-IR spectral range, the A-probe exhibits significantly stronger scattering at longer wavelengths towards the THz regime.

For the numerically simulated $S_2$ amplitude spectra using the method of moment (MoM) for the Akiyama probe, the calculation considers the demodulation of tip position as well as finite incident angle and collection angles. The scattered field $E(\omega, \theta_i, \theta_c)$ is simulated for all the permutations of $\theta_i=40°, 45°, 50°, \ldots, 80°$ and $\theta_c=40°, 45°, 50°, \ldots, 80°$, where $\theta_i$ is the incident angle and $\theta_c$ is the collection angle with respect to sample surface normal. The total collected signal is the average over all $E(\theta_i, \theta_c)$. The dashed line 78 indicates the length of the A-probe.

This simulation result demonstrates that the A-probe is ideal for far-IR s-SNOM imaging, e.g., with an incident wavelength A in the range of ~20 to ~100 µm. In the spectra 76 shown in FIG. 5C, multiple peaks are observed, which is attributed to the antenna resonances.

Figure 6A:
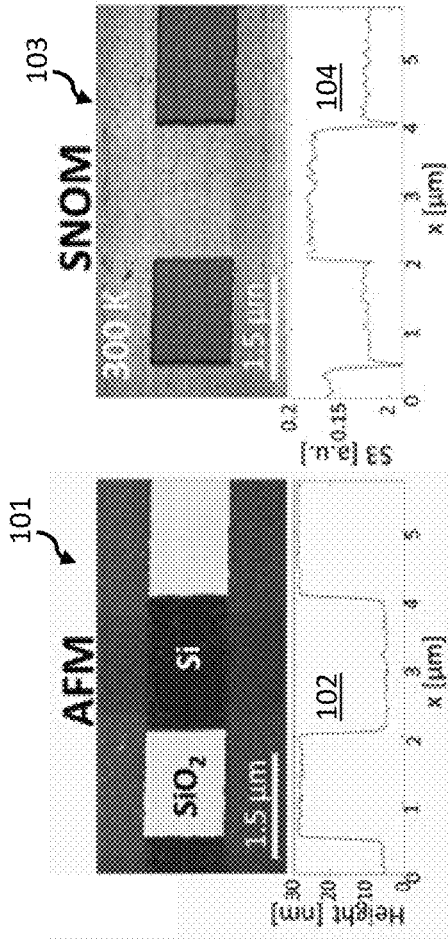
FIG. 6A depicts a room temperature AFM topography image and $S_3$ (third harmonic) image of a first semiconductor structure sample including $SiO_2$ on Si taken with the RT and LT apparatus of FIGS. 1A, 1B, respectively.
Figure 6B:
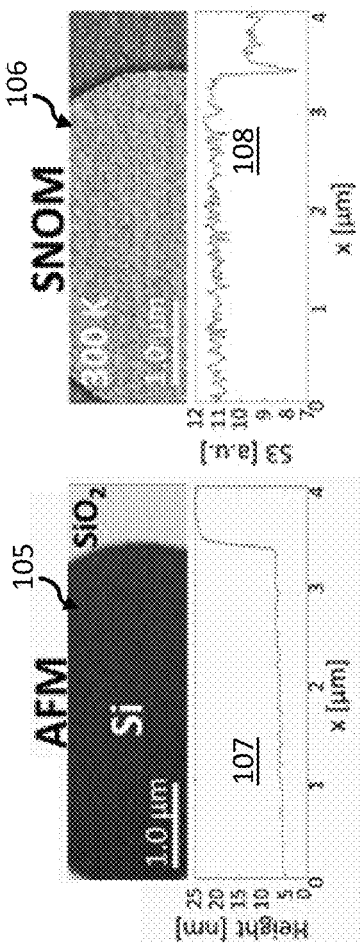
FIG. 6B depicts a room temperature AFM topography image and $S_3$ (third harmonic) image of a second semiconductor structure sample including $SiO_2$ on Si taken with the RT and LT apparatus of FIGS. 1A, 1B, respectively
Figure 6C:
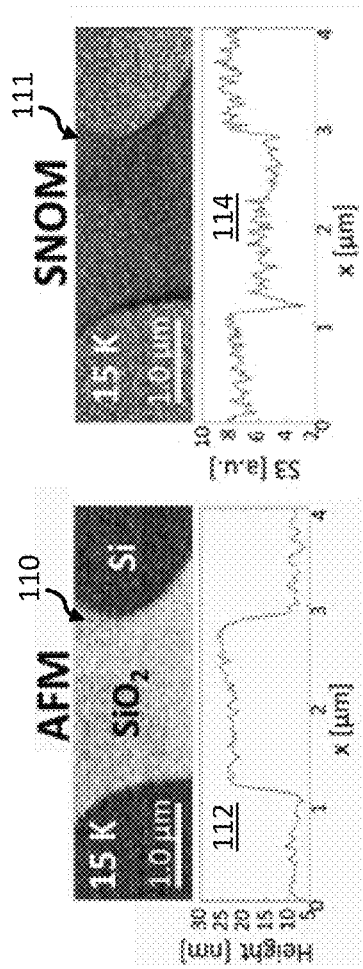
FIG. 6C depicts the topography image and $S_3$ image of the same sample structure shown in FIG. 6B.

To characterize the signal-to-noise (S/N) and near-field contrast of the s-SNOM measurements at room temperature (e.g., 300° K) and 15° K, FIGS. 6A-6C provide a nanoimaging of a test sample such as a standard 20 nm $SiO_2$/Si test sample from commercial companies NT-MDT LLC. (RT system) and NanoAndMore USA Corp. (LT system).

FIG. 6A particularly depicts room temperature AFM topography image 101 and $S_3$ (third harmonic) image 103 of a first semiconductor structure sample including $SiO_2$ on Si taken with the RT and LT apparatus of FIGS. 1A, 1B, respectively. In FIG. 6A each structure's corresponding horizontal line profiles 102, 104 are shown taken through the middle of the images. FIG. 6B depicts room temperature AFM topography image 105 and $S_3$ (third harmonic) image 106 of a second semiconductor structure sample including $SiO_2$ on Si taken with the RT and LT apparatus of FIGS. 1A, 1B, respectively. In FIG. 6B, further shown at the bottom of each topographical image 105, 106 are each structure's corresponding horizontal line profiles 107, 108 taken through the middle of their respective images.

FIG. 6C depicts the topography image 110 and $S_3$ image 111 of the same sample structure shown in FIG. 6B, acquired at 15° K using the LT apparatus of FIG. 1B with each structure's corresponding horizontal line profiles 112, 114 shown taken through the middle of the images.

In particular, as shown in FIG. 6A, it is found that the S/N of $S_3$ is greater than 30 for the RT system. For the LT-SNOM, the S/N at 300° K is about a factor of two larger than at 15° K (FIGS. 6B and 6C). This is because, at room temperature, the Q-factor of the A-probe is more than an order of magnitude lower than at low temperatures, allowing for faster rastering and easier optimization of AFM feedback parameters. The near-field contrast between the $SiO_2$ and Si, $S_3(SiO_2)/S_3(Si)$, with about a 10 µm incident light has a consistent value of about 0.7 throughout the experiments.

The following presents two case studies of the application of the A-probe system to two-dimensional materials. The first case study, shown in FIGS. 7A and 7B, is a near-field photocurrent measurement using the RT setup of FIG. 1A. FIG. 7A shows an example sample in the form of a semiconductor device structure 90 having closely placed source electrode 92 and drain electrode 94 of gold (Au) on top of a bilayer graphene channel 95 formed on a Si substrate. The system (e.g., FIG. 1B, is configurable for measuring near-field photocurrent, which probes the tip-induced thermoelectric, thermovoltaic, or photovoltaic effects down to 20 nm length scale. Photocurrent measurements at low temperature and 7 T magnetic fields are demonstrated in the graphene sample.

In a first case study, as shown in FIG. 7A, the A-probe tip-enhanced IR light 36 creates a local temperature gradient 96 which can induce a directional photocurrent with the presence of local inhomogeneities (and thus, local variations of the Seebeck coefficient). Instead of gathering the scattering signal, the system detects the near-field photoinduced current 97 between the two closely placed electrodes 92, 94 on top of the bilayer graphene sample 95. The near-field photocurrent signal ($P_n$) 97 is amplified by a preamplifier 100 and demodulated at higher harmonics (n≥2) of the tip tapping frequency. In FIG. 7B, there is shown the AFM topography and in FIG. 7C there is shown the detected third harmonic signal $P_3$. A good signal-to-noise ratio of 20 is found for $P_3$ (third harmonic) with approximately 13 mW incident power and an applied −20 V back-gate voltage at 300° K. It is observed that the strongest signal is in the vicinity of the electrodes, as expected, and observed fringes close to suspected line defects as shown in FIG. 7C. The fact that the signal is strongest and reversely signed at the two electrodes suggests the observing of the Seebeck effect.

A second case study shown in FIGS. 8A-8C demonstrates AFM topography (FIG. 8B) and the detected fourth harmonic $S_4$ image of λ=10.6 m SNOM data (FIG. 8C) taken at ambient conditions in commercially available polycrystalline graphene. FIG. 8A shows the same semiconductor structure sample of FIG. 7A including the two closely placed Au contact electrodes 92, 94 on top of the bilayer graphene sample 95. The A-probe tip-enhanced IR light 36 creates polariton excitation and modulation 91. FIG. 8C depicts the line defects 97 in graphene at ambient temperature, revealed by the plasmon polariton fringes due to scattering at grain boundaries and topographic features. The line defects are not identified in AFM image shown in FIG. 8B.

It is the case that the scans of FIGS. 8B, 8C reveal information beyond the typical optical contrast between graphene and the (probably insulating) islands associated with defects/adsorbates. There is observed 'halos' 93 and line defect 'highways' 97 surrounding and connecting topographic features which arise from efficiently damped plasmonic scattering at grain boundaries or defect structures. A good S/N can be achieved routinely up to the $4^{th}$ harmonic of the tapping frequency as shown in FIG. 8C.

These case studies demonstrate the particular strength of using a tuning fork-based Akiyama probe for room temperature s-SNOM and cryo-SNOM. The nano-imaging capability at room and low temperatures demonstrate its potential for near-field photocurrent mapping. In principle, this method is not limited to mid-IR and can be extended to near- and far-IR, as demonstrated using the full-wave simulation.

Using the A-probe tip with the AFM obviates the need for complex AFM sensing circuitry that requires two different light beams for measuring topography and optical properties of the sample which requires excess space. The use of the A-probe system provides for a compact system that facilitates integration into a cryo-chamber providing low-temperature and magnetic field environment. That is, due to the much-simplified experimental layout, the Akiyama probe s-SNOM is used for a cryo-SNOM system that can be used in high magnetic fields.

The piezo-based cryo-SNOM system described herein thus is a compact and high-resolution near-field microscope system that can be incorporated into many systems of varying sizes with greater ease. Existing instruments may be fitted (or retro-fitted) with the piezo-based probes described herein.

Figure 9:
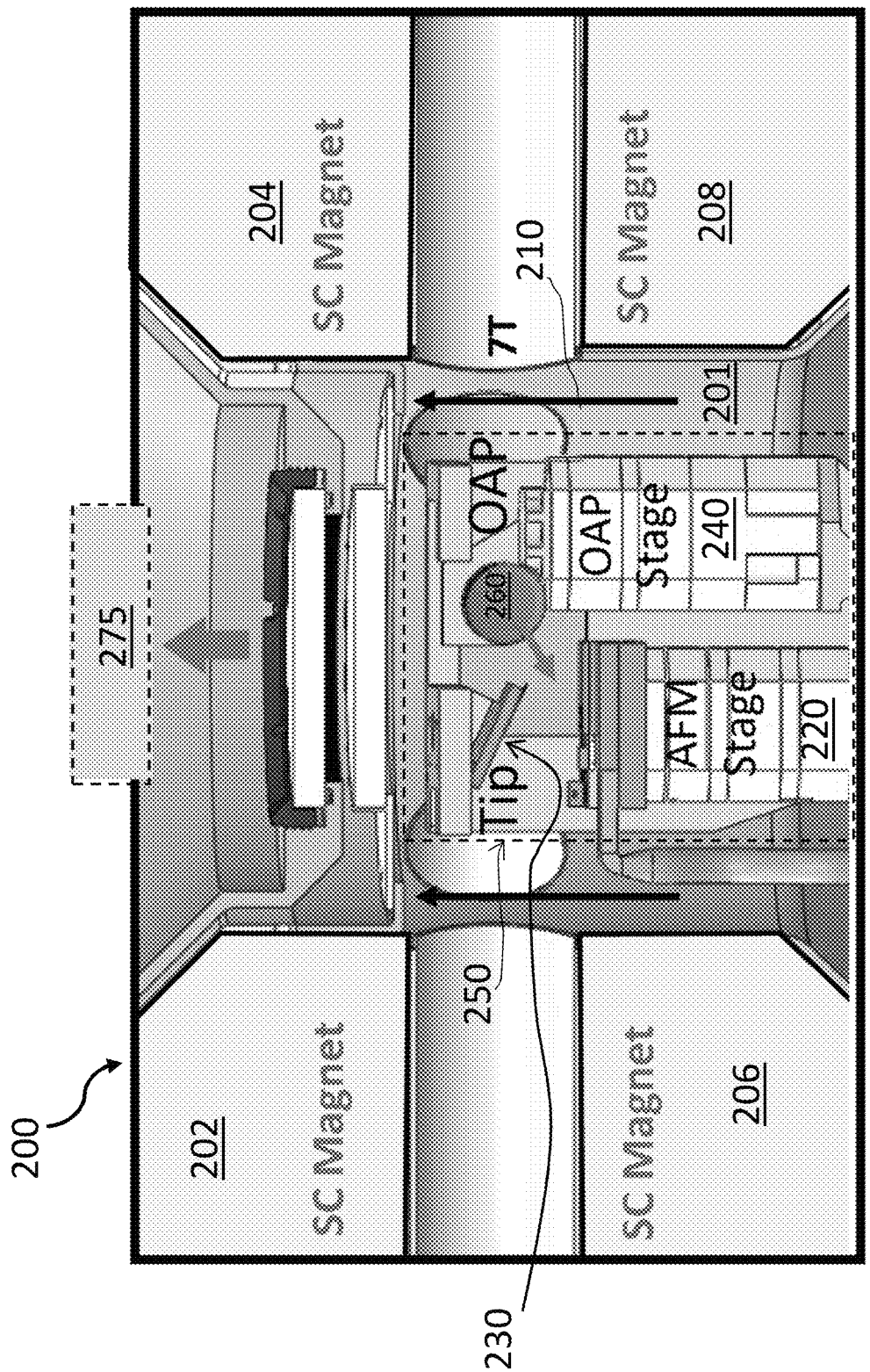
FIG. 9 depicts an exposed cross-sectional view of a cryostat including a vacuum chamber for housing a cryo-SNOM system such as the LT s-SNOM system shown in FIG. 1B.

FIG. 9 depicts an exposed cross-sectional view of a cryostat 200 including a chamber 201 for housing a cryo-SNOM system 250 such as the LT s-SNOM system shown in FIG. 1B, to provide infrared range nanoimaging capabilities at cryogenic temperature and under magnetic fields up to 7 Tesla. In an embodiment, FIG. 9 depicts a closed-cycle cryostat 200 housing an AFM sample stage 220 and off-axis parabolic mirror stage 240 of the cryo-SNOM system. Further shown in FIG. 9 is the location of the fixed A-probe tip 230 and the OAP mirror 260 mounted on OAP scanning stage for providing s-SNOM light beam to a sample to be probed.

As shown in FIG. 9, the cryostat 200 includes a cryogenic vacuum chamber 201 (e.g., OptiCool® from Quantum Design, Inc. San Diego, CA). This cryostat is a closed cycle system with four superconducting magnets 202, 204, 206, 208 operable to generate up to 7 Tesla magnetic field 210 at the center of the chamber 201. The cryostat chamber 201 can maintain a vacuum pressure of about $10^{-6}$ Torr and the base temperature, with no extra hardware, is 1.6° K. To get to 10° K, helium gas is compressed by a pulse tube cryocooler. To go below 10° K, 4° K liquid helium is expanded to get 1.6° K liquid helium, which is sent to a 4 K° plate and sample column where the Cryo-SNOM hardware sits. Further provided is a window providing a CCD camera 275 or like imaging device access to a sample being probed.

As shown in FIG. 9, mounted within chamber 201 are the AFM stage 220 and a piezo-actuated OAP stage 240 of the cryo-SNOM system and their 3-dimensional scanning stages and positioners. Such sample scanning and positioning stages are from Attocube (models ANSxyz100/LT/UHV and ANPxyz101/LT/UHV, respectively). The mechanical noise of the s-SNOM tested by the PI is less than 0.5 nm in z-axis direction and less than 20 nm in xy direction (resolution limited) at 100 K. In an embodiment, the AFM has a spatial resolution of about 15 nm and a scan area of 50×50 $\mu m^2$ at room temperature. The accessible temperature range of the scanning probe system is about 28 K-350 K. A $CO_2$ laser centered at ~11 µm and a QCL laser centered at 6.4 µm are used for the photocurrent and s-SNOM imaging. The laser power before entering the Opticool chamber is around 10 mW-15 mW. The laser is focused onto the tip with a spot size ranging from approximately 10-20 µm. A self-homodyne detection scheme is implemented which yields a stable scattering signal detection and a good signal contrast.

Figure 10:
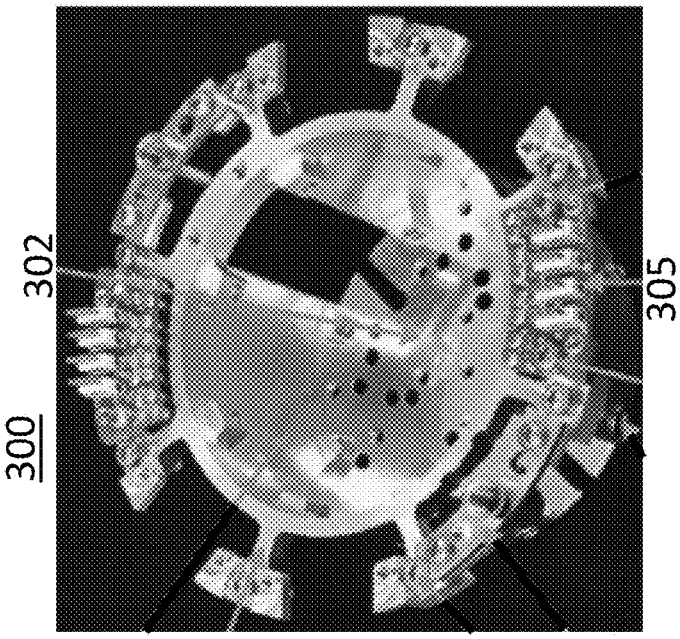
FIG. 10 shows a sample pod used to mount the cryo-SNOM hardware inside the cryostat vacuum chamber in an embodiment.

FIG. 10 shows a sample pod 300 used to mount the cryo-SNOM hardware inside the cryostat vacuum chamber 201. This sample pod 300 includes brass walls, pod flanges 303 and a brass mounting plate 302 configured to accommodate the mounting of the cryo-SNOM hardware inside cryostat chamber 201 and facilitate all connections needed for cryo-SNOM operations. The pod consists of a brass ring with circuit boards 305, which allows the pod to be screwed into the chamber and establishes electrical connections to outside of the chamber.

Figure 11:
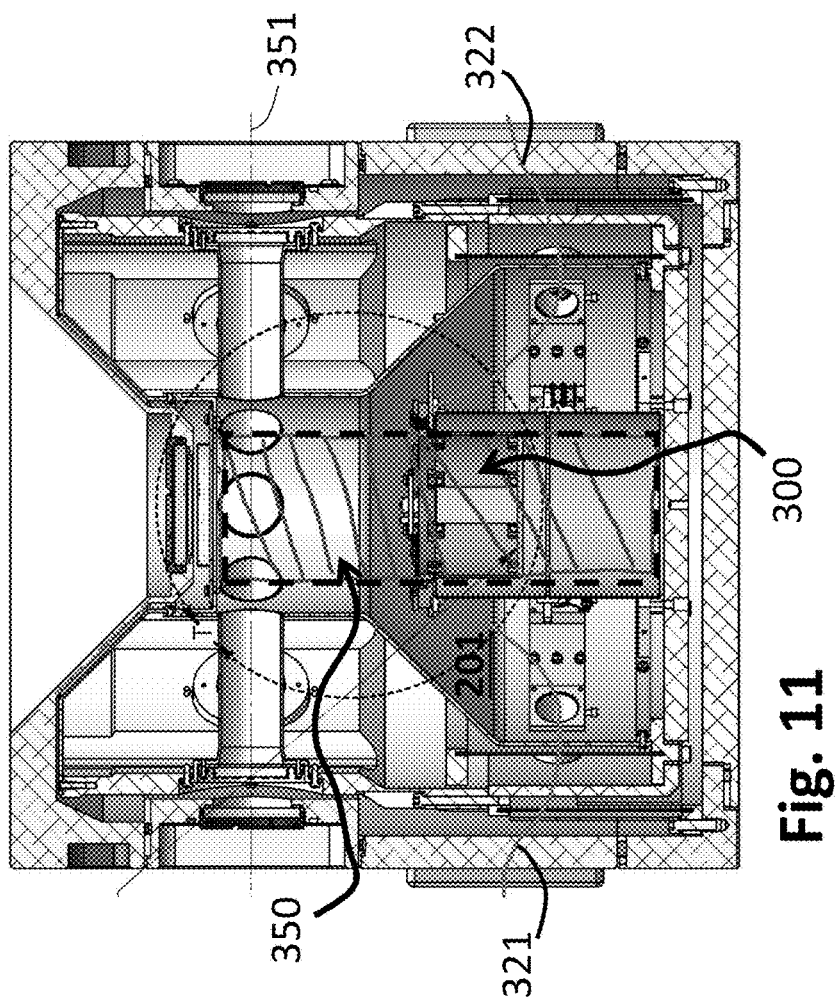
FIG. 11 is an illustration depicting a sample pod placed inside the cryostat chamber in an embodiment.

FIG. 11 depicts a sample pod 300 placed inside the cryostat chamber 201. Two wiring paths 321, 322 from the pod 300 to outside the chamber are shown. Further depicted is a region 350 representing the usable volume inside the chamber 201. As shown in the embodiment depicted in FIG. 11, the total distance from the bottom of the sample pod to the magnetic field center line 351 is about 90 mm.

FIG. 12 shows a self-contained non-magnetic housing unit 400 for enclosing the cryo-SNOM system of FIG. 1B minus the interferometer. Housing unit 400 includes a bottom base plate 401 including a portion 402 upon which is situated a first cylindrical-shaped vessel 420 within which is situated the 3-dimensional sample positioning components include three sample stages and three piezo-positioners for the AFM devices to provide XYZ positioning of the sample to be scanned, a sample scanner device and precision drive circuitry 410 operable for scanning the sample, and a sample holder platform 415 for holding the sample to be scanned. In an embodiment, all piezo-positioners are rated for use at 4° K and up to 12 T. In an embodiment, the sample mounting plate has a diameter of about 59 mm. Situated in close proximity above the sample holder 415 is a tip holder 425 for holding the PCB including the A-probe of the cryo-SNOM system in a fixed position relative to the sample holder 415. In an embodiment, the sample plate to tip distance is about 5 mm. The tip holder 425 is mounted on a top plate structure 430 and extends downward at an angle (e.g., 24 degrees with respect to the horizontal) so the A-probe tip is situated at a corresponding angle with respect to the sample.

The self-contained housing unit 400 and attached components for housing the cryo-SNOM system of FIG. 1B as depicted can be made of a non-magnetic material, e.g., Aluminum, Titanium, and is designed to provide increased mechanical stability by minimizing vibrations. The enclosure exhibits low mechanical noise (reduces AFM noise), is space efficient, and can achieve a lower operating temperature.

Figure 13:
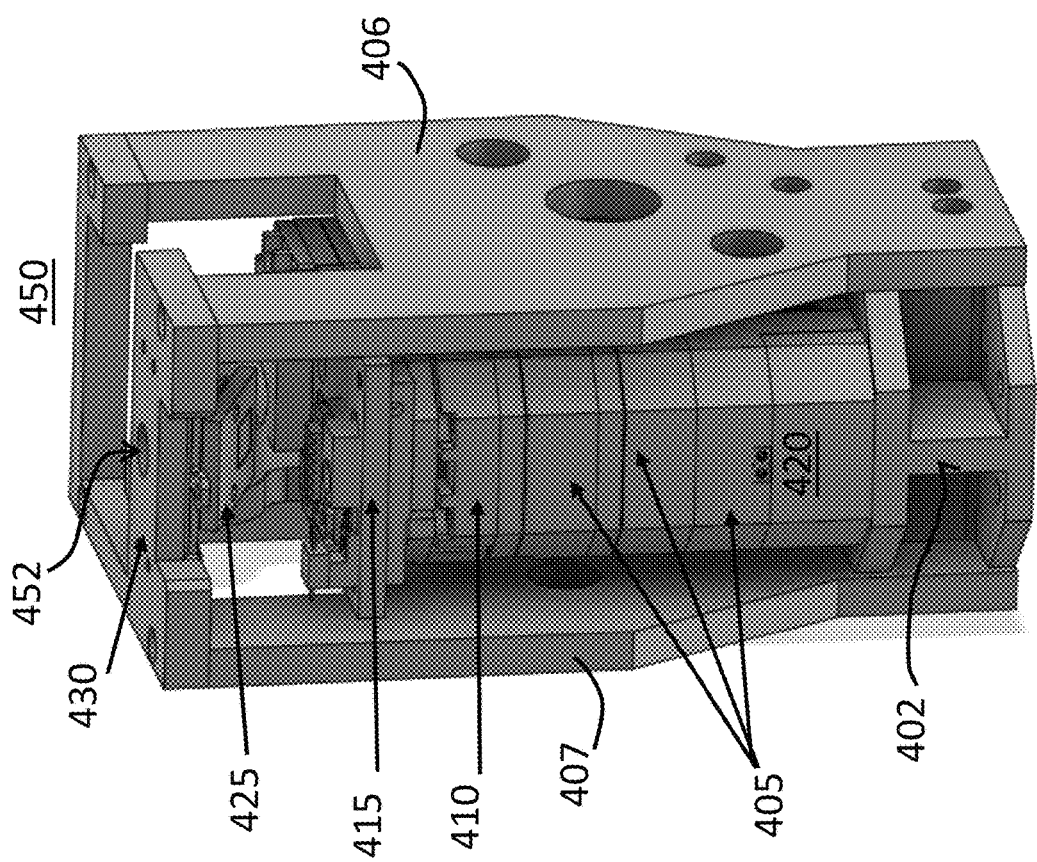
FIG. 13 depicts a side view of the probe-tip side and first cylindrical vessel of the self-contained non-magnetic housing unit of FIG. 12.

FIG. 13 depicts a side view 450 of the tip side and the first cylindrical vessel 420. In an embodiment, as shown in FIG. 13 depicting the tip side view 450 of the housing 400 of FIG. 12, the top plate 430 includes an opening 452 to view the A-probe tip and sample with a microscope from outside the chamber. As seen in the corresponding tip side view 450 of FIG. 13, the enclosure 400 includes a front wall 406 and a back wall 407 connecting top plate 430 to bottom plate portions 402 and 403.

Figure 14:
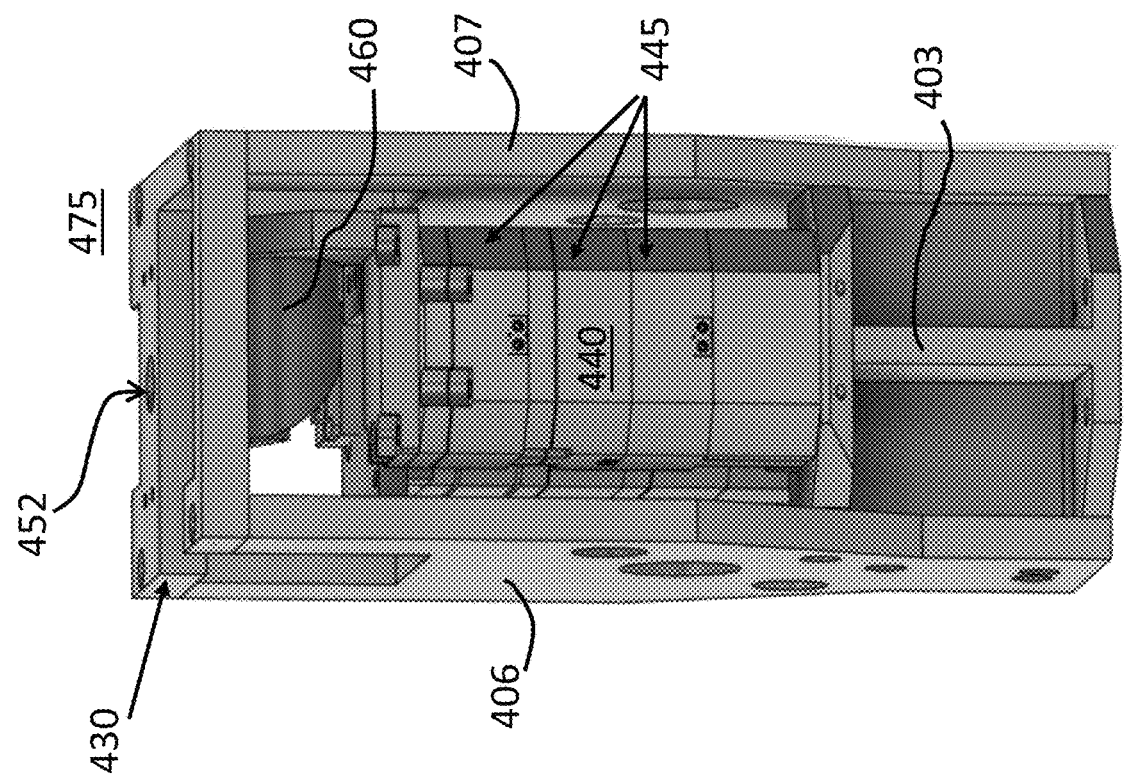
FIG. 14 depicts a corresponding mirror side view of the self-contained non-magnetic housing unit of FIG. 12.

Referring back to FIG. 12, the bottom plate 401 of the self-contained housing unit 400 for housing the cryo-SNOM system 250 of FIG. 9 includes a second base plate portion 403 upon which is situated a second cylindrical enclosure or vessel 440 within which is provided mirror positioning devices and associated three piezo-positioners 445 for providing the 3-dimensional XYZ positioning of the near-field optics including the OAP mirror 470. Due to the location of a window used for light coupling, the parabolic mirror is mounted on the positioners for XYZ positioning. Located above the vessel 440 is the parabolic mirror mount 460 for mounting the parabolic mirror 470 guiding light to the mounted A-probe tip during sample probing operations. FIG. 14 depicts a corresponding mirror side view 475 of the housing 400 of FIG. 12. As seen in the corresponding mirror side view 475 of FIG. 14, the enclosure 400 includes a front wall 406 and a back wall 407 connecting top plate 430 to bottom plate portions 402 and 403. Although not shown in FIGS. 13, 14, ceramic spacers are situated between the top plate and side walls to provide some thermal isolation for the tip to reduce the Q-factor.

FIG. 15 shows the top view of the s-SNOM system enclosure including the top plate 430 and showing the opening 452 for enabling visualization of the sample and A-probe tip.

FIG. 16 shows a front view of the self-contained housing unit 400 including the front wall 406 attached to the top plate 430 and attached to the base plate 401 using connectors 480, e.g., screws. The front wall 406 includes an opening 455 enabling access to the A-probe mount 425 and sample holder 415. A series of holes 485 in the front wall is further provided for wire organization. FIG. 17 shows a corresponding back view of the self-contained housing unit 400 including the back wall 407 attached to the top plate 430 and attached to the base plate 401 using attachment connectors 481. The back wall 407 includes an opening 465 enabling access to the A-probe mount 425 and sample holder 415 and OAP mirror mount 460. A series of holes 488 in the back wall is further provided for wire organization. In embodiments, these holes 488 are dimensioned to accommodate wiring paths for connecting the various AFM and OAP components, the wires including but not limited to: twisted pair wires for the three positioners and three scanners; two coax cables for the tip driving and output signals; five wires for the tip preamp: input, output, +/−7.5V preamp power and ground; one coax cable for sample photocurrent measurements; and a wire for sample gating.

Figure 18:
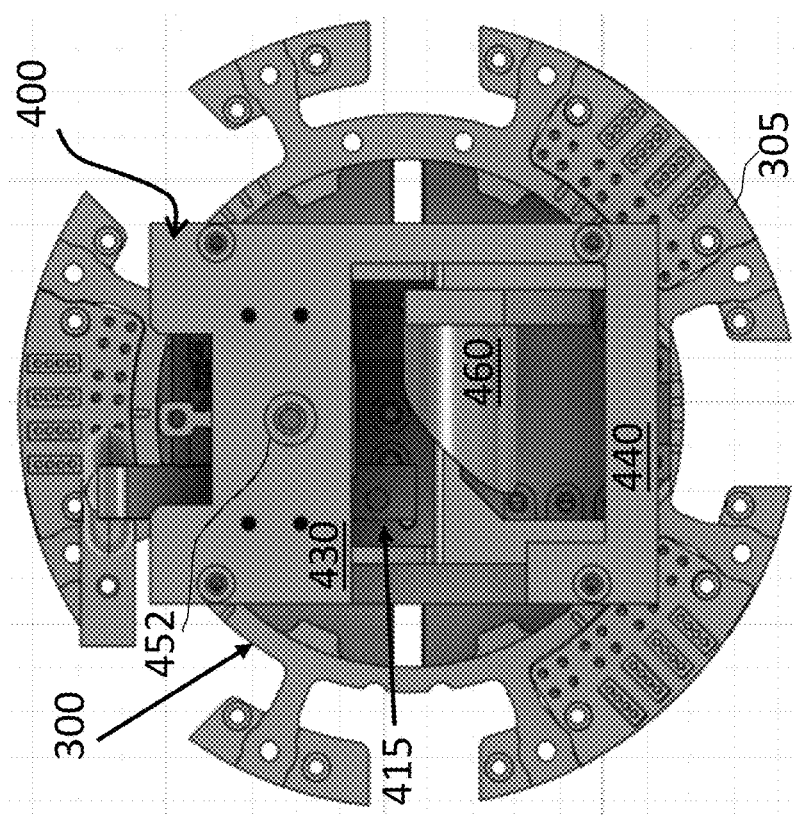
FIG. 18 shows a top view of the cryo-SNOM system housing unit fitted in the sample pod for incorporation in the cryostat chamber in an embodiment.

As further shown in FIG. 16, front wall 406 includes inwardly tapered portions 476 near respective base plate connection portions 480. Similarly, as shown in FIG. 17, back wall 407 includes inwardly tapered portions 477 near respective base plate connection portions 481. The inward tapered portions 476, 477 of the respective front wall and back wall decrease the overall footprint of the lower portion of cryo-SNOM system housing enclosure 400 while not sacrificing mechanical stability. The decreased footprint of the base portion of the enclosure 400 for housing the cryo-SNOM system 250 of FIG. 9 enables the fitting of the cryo-SNOM system into the cryostat sample pod 300 used to mount the cryo-SNOM hardware inside the cryostat vacuum chamber 201. FIG. 18 shows a top view of the cryo-SNOM system housing enclosure 400 fitted in the sample pod 300 for incorporation in the cryostat chamber.

Figure 19:
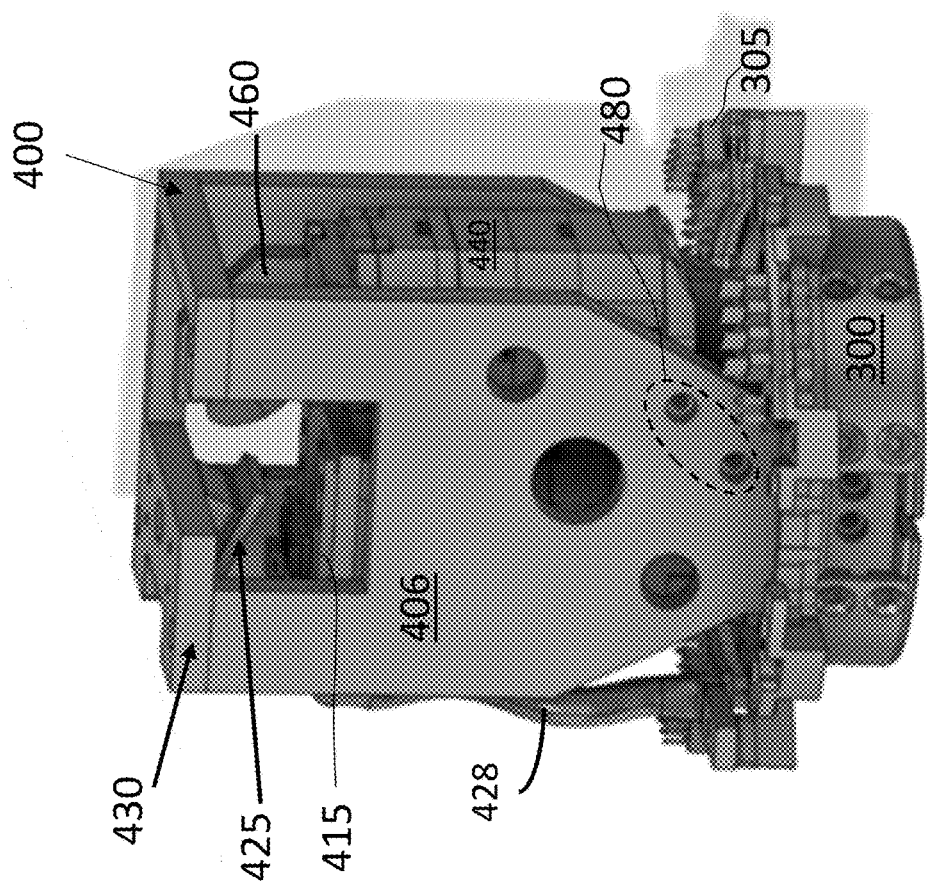
FIG. 19 depicts an elevation view of the cryo-SNOM system housing unit fitted within the sample pod for incorporation in the cryostat chamber

FIG. 19 depicts an elevation view of the cryo-SNOM system housing enclosure 400 fitted within the sample pod 300 for incorporation in the cryostat chamber. In the embodiment shown in FIG. 19, a copper braid 428 is provided to create a thermal link to the sample pod.

It is the case that subwavelength confinement, chiral sensing, and programmable manipulation of infrared light at the nanoscale are highly desirable for photonic and optoelectronic applications of quantum materials. By breaking the time-reversal symmetry, magnetic fields enable novel light-matter interactions with important real space features such as chiral magnetopolaritons, unidirectional edge photocurrent, and nonreciprocal light propagation at magnetic interfaces. These novel phenomena are inherently related to the electronic states at the edges of two-dimensional materials via quantum state transitions.

As known, a magnet changes the trajectory of electrons but does not usually have a strong interaction with light. However, by coupling to confined light at the nanoscale, for example through polariton excitations or photo-induced Hall edge currents, the magnetic field can interact strongly with light-initiated collective excitations. One canonical example of an intrinsic magnetic field-induced optical excitation is the inter-Landau level transition ('LL transition'), which is of paramount importance for studying bulk and edge states in two-dimensional electronic systems. In graphene, the LL transition, which is inherently a quantum transition, can be observed even at close to room temperature in a high magnetic field, e.g. 7 T.

In a further embodiment, the cryo-SNOM system of FIG. 1B employed in a cryostat environment of FIG. 13 using light at infrared (IR) or terahertz (THz) frequencies and used in conjunction with high magnetic fields up to 7 Tesla renders a magneto scanning near-field optical microscope (m-SNOM) system that can be used to visualize the generation of Dirac magnetoplasmons due to LL transitions ('Landau plasmons') in near charge-neutral monolayer graphene. By on-resonance excitation of the LLs, there can be observed a clear magnetic field-tuned plasmon polariton signature in real space and a greatly enhanced photocurrent generation at the edges of graphene.

Generally, such an m-SNOM platform (performed under the s-SNOM framework) can be used to study low-energy excitations in quantum material systems with the breaking of time-reversal symmetry. This is especially important at low photon energies (e.g., 1-1000 meV), since a plethora of low-energy magneto-optical phenomena can now be investigated with a spatial resolution down to 10 nm, such as chiral edge plasmons or nonreciprocal polaritons. The m-SNOM platform can be used to directly visualize infrared plasmon polaritons due to the quantized Landau transitions in near-charge neutral graphene. Via resonant inter-Landau level transition, the magnetoplasmon excitations at the edge of graphene can be mapped to associated enhanced edge photocurrent. Generally, the approach using m-SNOM platform is used to study enigmatic quantum effects including, for example, magnetic phase transitions, low-dimensional magneto-plasmon polaritons, and hybrid magnon-phonon polaritons in Dirac and Weyl electron systems.

Figure 20:
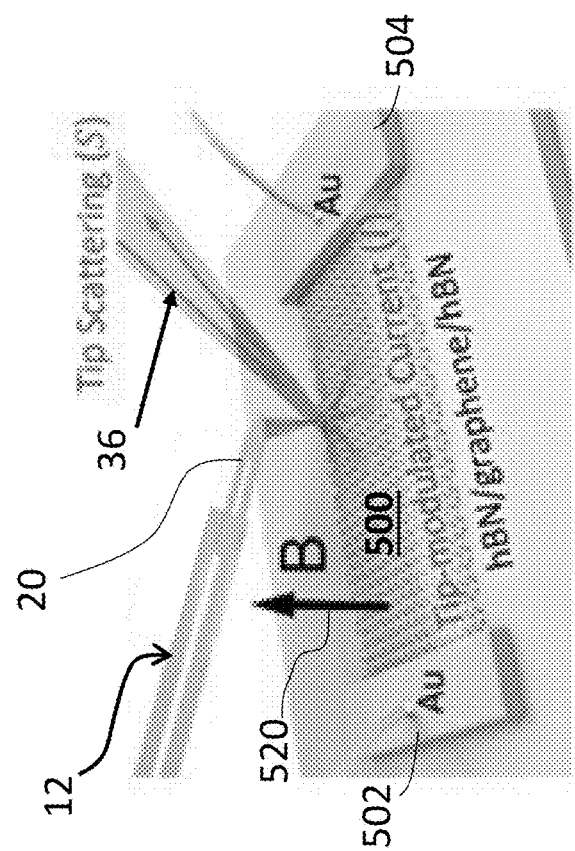
FIG. 20 shows a schematic of a sample field effect device consisting of a hBN/graphene/hBN heterostructure for use in studying low-energy excitations in an m-SNOM platform according to embodiments herein.

FIG. 20 shows a schematic of a sample field effect device consisting of a hBN/graphene/hBN heterostructure 500 including a monolayer graphene encapsulated between two thin hexagonal boron nibride (hBN) slabs (top and bottom thickness of ~5 nm and ~28 nm, respectively) for use in studying low-energy excitations in an m-SNOM platform. This structure 500 includes gold electrodes 502, 504 fabricated on the two sides of the hBN/graphene/hBN heterostructure and the structure is tuned to be close to the charge neutral point (CNP). Additionally shown is the A-probe 12 having cantilevered tip 20, and incident light 36. A fourth harmonic of the tip scattering signal ($S_4$) and tip-modulated near-field photocurrent ($I_3$) signal are measured simultaneously. Most of the results are demonstrated at 200 K, although similar phenomenon has been observed in a wider temperature range (100K to 300K). In FIG. 20, both the scattered near-field $S_n$ and the tip-modulated photocurrent $I_n$ are demodulated at higher harmonics ($n \geq 2$) of the tip resonance frequency to eliminate the far-field background.

As shown in FIG. 20, for near-CNP graphene in a magnetic field, Landau transitions yield resonances of the optical conductivity ($\sigma_{xx}$) at discrete photon energies $E_n = \text{sgn}(n)\sqrt{2e\hbar v_F^2|nB|}$, where n is the energy level index, sgn(n) is positive (negative) for electrons (holes), $v_F$ is the Fermi velocity, and B is the applied magnetic field 520. With an incident photon energy of ~111 meV (~11.2 μm, 895 cm$^{-1}$), the optical transition between the $0^{th}$ to $1^{st}$ Landau Levels ($LL_{0 \to 1}$ or $LL_{-1 \to 0}$) is accessed.

Figure 21B:
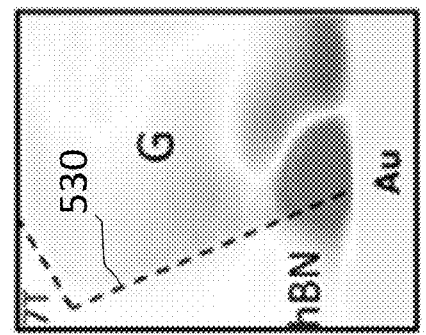
FIG. 21B depicts an m-SNOM near-field photocurrent images ($I_3$) of graphene, taken simultaneously with the m-SNOM image ($S_4$) of FIG. 21A.
Figure 21A:
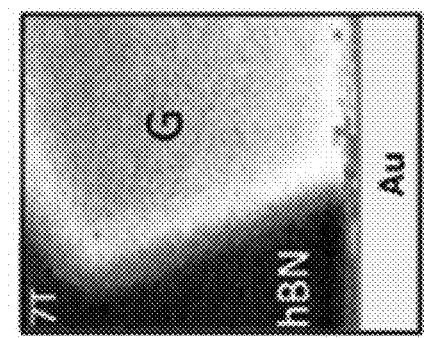
FIG. 21A depicts an m-SNOM image ($S_4$) of the hBN-graphene boundary in an embodiment.

FIG. 21A depicts an m-SNOM image ($S_4$) of the hBN-graphene boundary. The gold electrodes are on the top and bottom sides of the sample, consistent with the schematic in FIG. 20.

FIG. 21B depicts an m-SNOM near-field photocurrent image ($I_3$) of graphene, taken simultaneously with the m-SNOM image ($S_4$) of FIG. 21A. The boundary of graphene is outlined with dashed line 530.

FIGS. 22A and 22B depict results of magnetic field tuning of the $0^{th}$ to $1^{st}$ Landau Level transition in a near-charge neutral graphene as revealed by m-SNOM shown in successive images in FIG. 22A and as corresponding near field photocurrent imaging in FIG. 24B. The incident light has a wavelength of ~11.2 μm (~111 meV or ~900 cm$^{-1}$) and the sample is sitting at 200K. The dashed lines 615 in FIG. 22A outline the edges of the graphene.

FIG. 22A in particular shows the successive experimental m-SNOM scattering images 600 of the $S_4$ (fourth harmonic signals) on monolayer graphene from 0 T to ±7 T. The LL transition manifests itself through increased absorption of the incident light by the graphene sheet, as is evident in the relative near-field scattering contrast ($S_4$) between graphene and hBN. From 0 T to below 5 T, the absorption of the incident light is similar for hBN and graphene, providing little contrast between the two. At |5| T and |6| T, however, shown in image 605, the high-frequency tail-end of the first LL transition becomes accessible, leading to increased scattering of the incident light by graphene and thus, increased contrast between graphene and the substrate. At |7| T, shown in image 610, the coupling between the incident light and the first LL transition is the strongest, resulting in the increased scattering signal ($S_4$) and therefore a visually bright graphene sheet. A plasmon fringe is also evident at the non-contacted edges of graphene as indicated by the arrow 620 in the 6T image. Since the graphene is near charge neutral and slightly doped in between $LL_{-1}$ and $LL_0$, it is expected Landau plasmons arise from the partially filled LLs. It is noted that the amplitude and sign of the near-field contrast ($S_2$, $S_3$, or $S_4$) between graphene and hBN can depend very sensitively on the Fermi-velocity and electron scattering rate of graphene and varies from sample to sample. Since a homodyne detection scheme is used for the $S_4$ signal, only the relative contrast is meaningful according to: $|S_4^{grpahene}(B)/S_4^{hBN}(B)| \approx |S_4^{grpahene}(B)/S_4^{graphene}(B=0)|$.

The tip-initiated near-field photocurrent $I_3$ also has a strong dependence on the magnetic field (FIG. 22B). At zero field, shown in image 660, the signal 662, 663 is localized close to the gold contacts at the respective left and right sides of the graphene. This is because the gold contacts break the inversion symmetry, leading to a tip-induced thermal gradient across the electrodes and, therefore, a directional photocurrent due to the photo-thermoelectric effect. Far away from the electrodes or edges, the net photocurrent induced by the tip in every direction averages out to zero due to inversion symmetry. In the low magnetic field regime (<|1| T), the cyclotron motion of the thermo-electrons due to Lorentz force yields shrinking current 'hot spots' at opposite corners of the sample. The behavior of the near-field photocurrent in this low field regime can be explained via the Shockley-Ramo (SR) formalism and assuming a non-zero thermoelectric conductivity $\alpha_{xx}$ and $\alpha_{xy}$. The inset 650 at 0 T shows the band structure of graphene with the Fermi energy dashed line 652 tuned to the CNP. At higher fields (e.g. >|6| T), the current along the non-contacted edges of the graphene sheet manifests a clear photo-Nernst effect, where $\alpha_{xy}$ is peaked near charge neutral. At |7| T, image 665, this chiral photocurrent along the free edges of graphene is significantly enhanced compared to the low field values, and the current at the same edge has opposite directions for 7 T and −7 T. The inset 670 at 7 T shows the inter-Landau level transition being measured. Compared to the current generated using an incident light wavelength of 6.588 μm (188 meV, or 1518 cm$^{-1}$), where the 0→1 transition is not accessible, it is found that the photocurrent generated on resonance at 11.1 μm yields an enhancement of a factor of at least about 12 fold. This enhanced edge current is attributable to the on-resonance LL transitions. The box 675 shown in the bottom right corner of the sample at 7 T image shows the region being imaged in FIGS. 23A-23C.

Figures 23A, 23B, 23C:
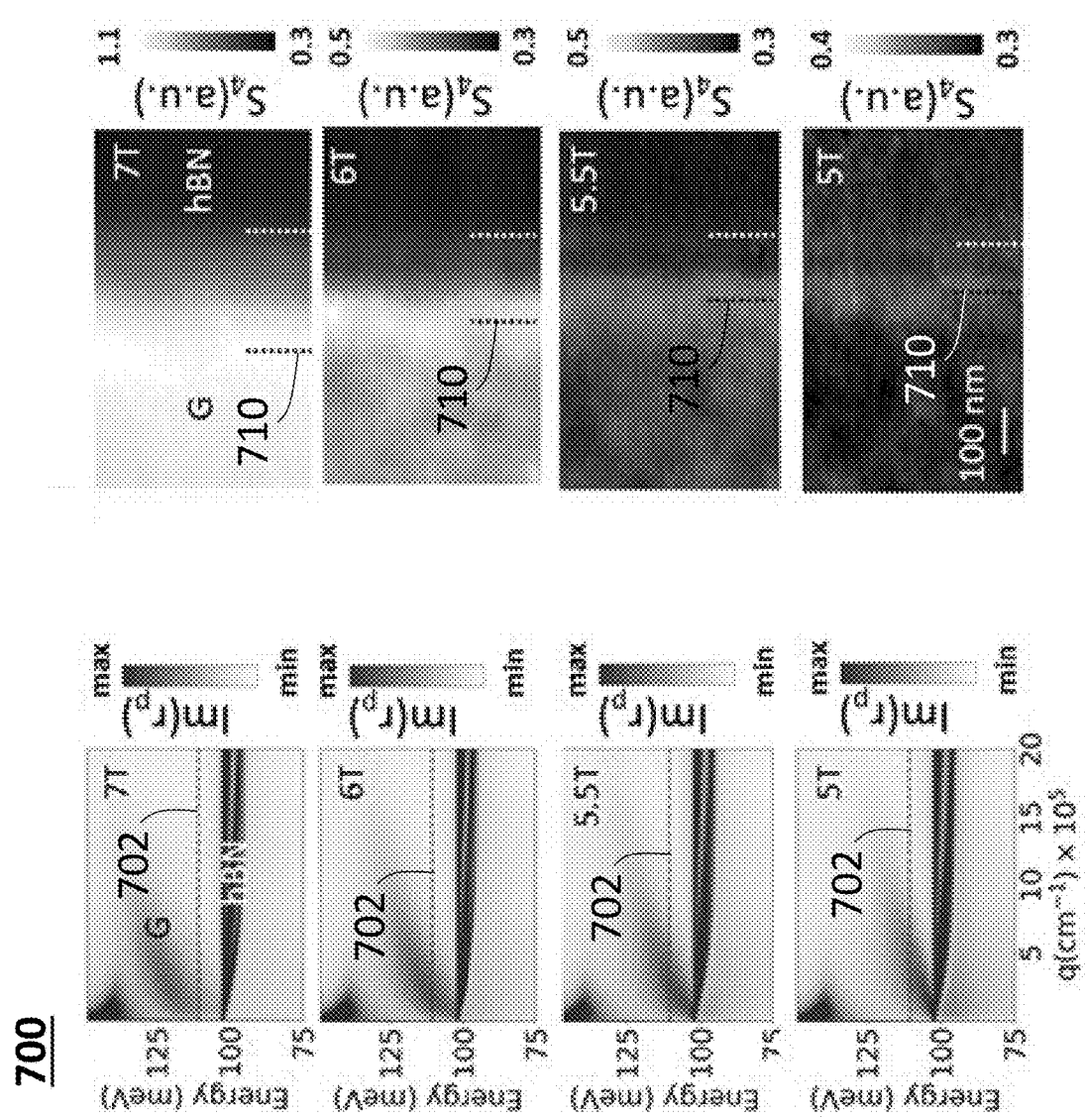
FIGS. 23A-23C depict results of a detailed study of the magnetic field tuning of Landau plasmons revealed in m-SNOM scattering images.

FIGS. 23A-23C depict results 700 of a detailed study of the magnetic field tuning of Landau plasmons revealed in m-SNOM scattering image of FIG. 23B and near-field photocurrent mapping of FIG. 23C at the graphene-hBN boundary corresponding to the area outlined at 675 as shown in the bottom right corner of the sample at 7 T image of FIG. 22B. The incident light has a wavelength of ~11.2 μm (~111 meV or ~900 cm$^{-1}$) and the sample is sitting at 200K. FIG. 23A in particular depicts the calculated imaginary reflection coefficient, $r_p$, at the same magnetic fields as in the images shown in FIGS. 23B, 23C, showing changes in Landau plasmon dispersion. The dashed line 702 indicates the applied laser frequency of 895 cm$^{-1}$. The dashed line 710 in FIG. 23B indicates the peak intensity of the plasmon.

In particular, FIGS. 23A-23C shows a detailed study performed at the edge of graphene, where the plasmon is the most evident within the limit of the laser frequencies. Beginning at ≥5T, interference fringes due to Landau plasmon polaritons become evident, for which the spatial extent gets clearly broadened with increasing magnetic field. The plasmon fringe extends from ~100 nm at 5 T to above ~200 nm at ±7 T, where the coupling between the incident light and the $LL_{0 \to 1}$ transition is the greatest. This increasing of the plasmon wavelength with B field is also expected from the calculation of the imaginary part of the reflection (lm ($r_p$)) as a function of frequency and in-plane momentum q. From a calculated optical conductivity, the system obtains the Landau plasmon dispersion at different magnetic fields. It can be seen in FIG. 23A that the Landau plasmon dispersion intersects the laser frequency with decreasing momentum as the magnetic field increases. This implies a longer plasmon wavelength at 7 T than at lower fields: ~400 nm at 7 T and ~200 nm at 5 T.

The evidence of the Landau plasmon is also seen in the near-field photocurrent images shown in FIG. 23C showing a fringe like pattern and broadening of the overall photocurrent signal at higher fields. This attests to a plasmon modulated photothermo-effect of graphene at the sample edge. It is noted that at the top of the images in FIGS. 23A-23C, there is a gold contact oriented in the horizontal direction (box 675 in FIG. 22B (e.g., at 7 T)). Close to the electrodes at the corners of graphene, the amplitude of the edge photocurrent can be increased or decreased, depending on the orientation of the field. This is consistent with the observation in FIGS. 20-22 and the interpretation of the combined photo-Seebeck and photo-Nernst effect.

FIGS. 24A and 24B show exemplary magnetic field-dependent Landau plasmon dispersion results 800 of the photocurrents (FIG. 24A) and results 850 of the s-SNOM line scans (FIG. 24B) at the graphene-hBN boundary while sweeping the magnetic field from 7 T to −7 T, respectively. The line scans 850 clearly show the Landau plasmon effects appearing between |5| T and |7| T and disappearing for magnetic fields in between 0 and |5| T. Note the scan speed is different between |5| T and |7| T.

FIG. 24C shows a simulated s-SNOM mapping of the magnetic field plasmon dispersion using the same parameters as the ones in FIGS. 25A-25C.

FIG. 24D depicts a plot of plasmon wavelength, $\lambda_p$, as a function of the magnetic-field, showing strong agreement between the simulation and experiment. Error bars originate in the standard deviations during Lorentz background fitting and plasmon fringe fitting.

That is, to obtain a magnetic field-dependent dispersion relation for the Landau plasmons, line scans are taken across the graphene/hBN boundary while sweeping the magnetic field from 7 T to −7 T, as shown in FIG. 24A-24D. This dispersion clearly shows the onset of the LL transition and Landau plasmons at ±5 T. The curvature of the plasmon fringes (shown as dashed curves 815, 816 in FIGS. 24A and 24B, respectively) suggests longer wavelengths (or equivalently, lower in-plane momentum q) of the plasmon polaritons at higher fields.

Notably, in the near-field photocurrent scans, a similar field-dependent dispersion is observed, as illustrated by the black dashed curve 815 in FIG. 24A. The longer length scale observed in the photocurrent measurements is consistent with the previous observation that the near-field photocurrent signal $I_3$ extends further into the bulk than the scattering signal ($S_4$) due to thermal diffusion. The field-dependent plasmonic features can also be simulated in real space using a commercial finite-element solver given the same parameters used in FIG. 23A. The simulated results (FIG. 24C) are in qualitative agreement with the experimental observations and suggests a wavelength of plasmon on the order of hundred nanometers and a Q factor larger than 2 at 200K.

To quantitatively reveal the Landau plasmon wavelength change on magnetic field in experiment, line cuts of s-SNOM signal are made along dash lines 816 in FIG. 24B. The oscillating s-SNOM signal corresponding to plasmon fringes can be observed under various magnetic fields, especially the ones after subtracting Lorentz backgrounds. By fitting these plasmon fringes, wavelength of Landau plasmon can be extracted and its magnetic field dependency is shown in FIG. 24D. It is shown that the Landau plasmon wavelength increases monotonically from 0.238 um at 5 T magnetic field to 0.405 um at 7 T.

The present disclosure implements the m-SNOM system configured to study infrared magneto-optics at the nanoscale. The m-SNOM system described implements methods demonstrating the generation and imaging of tunable graphene plasmons due to inter-Landau level transitions with subwavelength resolution. These plasmons are evident in m-SNOM images and have properties that are highly dependent on the applied magnetic field. The localized Landau plasmons also greatly influence the photocurrent distribution at the sample edge, leading to interesting current pathways along the sample edge.

The present disclosure implementing the m-SNOM system demonstrates the particular strength of near-field optical microscopy for resolving the magneto-plasmons and edge states in strong magnetic fields. In principle, this method is not limited to probing photo-induced quantum transitions at IR frequencies but can also be applied similarly with THz sources to address magneto-optical effects at much lower photon energies. At lower temperature, the absorption edge of the Landau plasmons can be extremely sensitive to Fermi level and scattering rate, which can be useful for studying many body physics in charge neutral graphene (e.g. Moiré modulated $v_F$).

The m-SNOM system can be further used to investigate at least four key spatial features at tens to hundreds of nanometers simultaneously: 1) field-tuned infrared or terahertz polaritons, 2) magnetic lengths, 3) edge photocurrent, and 4) moiré lattice periodicities. Further experiments on THz near-field microscopy and THz near-field emission spectroscopy can be performed on other Dirac and Weyl semimetals, which are predicted to process many intriguing properties including tunable light confinement, nonreciprocal effect, multi-photonic bands, and polarization conversion in magnetic fields or magnetic interfaces.

The described aspects and examples of the present disclosure are intended to be illustrative rather than restrictive, and are not intended to represent every aspect or example of the present disclosure. While the fundamental novel features of the disclosure as applied to various specific aspects thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or aspects of the disclosure may be incorporated in any other disclosed or described or suggested form or aspects as a general matter of design choice. Further, various modifications and variations can be made without departing from the spirit or scope of the disclosure as set forth in the following claims both literally and in equivalents recognized in law.

What is claimed is:

1. An apparatus for detecting optical properties of a sample comprising:
   a scattering-type scanning field near-field optical microscope having a self-sensing piezo-electric based probe including a cantilevered probe tip for probing the sample, the self-sensing piezo-electric based probe being driven using an electrical signal;
   a system for applying coherent light upon a sample being probed by the driven self-sensing piezo-electric based probe, the self-sensing piezo-electric probe generating a modified electrical signal responsive to a topography of said sample being probed; and
   a detector for imaging an optical property of the sample based on a coherent light-sample interaction in a near-field regime of the cantilevered probe tip interacting with said sample,
   wherein the applied electrical signal defines a cantilever tapping frequency and amplitude for tuning the self-sensing piezo-electric based probe.

2. The apparatus as claimed in claim 1, further comprising:
   a processor circuit operable for controlling the electrical signal applied to the self-sensing piezo-electric based probe, said processor circuit further adapted to measure an optical property based on the modified electrical signal generated by said probe interacting with said sample.

3. The apparatus as claimed in claim 2, wherein the self-sensing piezo-electric based probe comprises:
a tuning fork element adapted for oscillatory motion responsive to the driving electrical signal, wherein the cantilevered probe tip is attached to the tuning fork element, the tuning fork element adapted for translating a motion of the cantilevered probe tip in a direction orthogonal to the oscillatory motion of the tuning fork element.

4. The apparatus as claimed in claim 3, further comprising:
one of: a focusing lens or a parabolic mirror for focusing the coherent light upon the sample at a tip location.

5. The apparatus as claimed in claim 4 adapted for implementation at either a room temperature environment or in a cryostat providing a low temperature and high magnetic field environment in a cryostat vacuum chamber, the apparatus being compacted for mounting within the cryostat vacuum chamber.

6. The apparatus as claimed in claim 5, further comprising:
a sample platform for mounting the sample for a probing operation;
a first positioning system operatively connected to said sample platform for orienting said sample platform mounting said sample in three dimensions; and
a scanning device operatively connected to said sample platform for moving said sample platform in two dimensions during a probing operation.

7. The apparatus as claimed in claim 6, further comprising:
a second positioning device operatively connected to one of said focusing lens or parabolic mirror for positioning said one of said focusing lens or said parabolic mirror in three dimensions for focusing the coherent light upon said sample.

8. The apparatus as claimed in claim 7, further comprising:
a self-contained unit adapted for mounting within said cryostat vacuum chamber, said self-contained unit comprising:
a first vessel structure for enclosing the first positioning system and for enclosing said scanning device, the sample platform being located above the first vessel structure,
a first mounting structure for mounting the cantilevered probe tip of said self-sensing piezo-electric based probe above the sample platform;
a second vessel structure for enclosing the second positioning system; and
a second mounting structure for mounting the one of said focusing lens or parabolic mirror above the second vessel structure in proximity to said sample platform.

9. The apparatus as claimed in claim 8, wherein said self-contained unit is adapted for placement within a pod mountable within said cryostat vacuum chamber, the pod defining a three-dimensional space for receiving said self-contained unit.

10. The apparatus as claimed in claim 5, wherein the low temperature is less than 100° K and ranges from anywhere between 4° K-20° K.

11. The apparatus as claimed in claim 5, wherein the high magnetic field ranges from between −7 T to +7 T.

12. The apparatus as claimed in claim 5, wherein said applied coherent light upon the sample ranges from a near infrared frequency to Terahertz frequency.

13. The apparatus as claimed in claim 12, wherein said system for applying coherent light upon a sample being probed comprises: an optical interferometer.

14. The apparatus as claimed in claim 5, adapted for imaging tunable graphene plasmons due to inter-Landau level transitions with subwavelength resolution.

15. An apparatus for performing scattering-type scanning field near-field optical microscopy at cryogenic temperatures and in high magnetic fields, the apparatus comprising:
a scattering-type scanning field near-field optical microscope having a self-sensing piezo-electric based probe including a cantilevered probe tip for probing the sample, the self-sensing piezo-electric based probe being driven using an electrical signal;
a first system for applying coherent light upon a sample being probed by the driven self-sensing piezo-electric based probe, the self-sensing piezo-electric probe generating a modified electrical signal responsive to a topography of said sample being probed;
a second system for applying a magnetic field to said sample; and
an interferometer and detector for measuring optical properties of the sample based on light-sample interactions in the near-field regime of the cantilevered probe tip interacting with said sample,
wherein the applied electrical signal defines a cantilever tapping frequency and amplitude for driving the self-sensing piezo-electric based probe.

16. The apparatus as claimed in claim 15, further comprising:
a processor circuit operable for controlling the electrical signal applied to the self-sensing piezo-electric based probe, said processor circuit further adapted to measure an optical property based on the modified electrical signal generated by said probe interacting with said sample.

17. The apparatus as claimed in claim 16, wherein the self-sensing piezo-electric based probe comprises:
a tuning fork element adapted for oscillatory motion responsive to the driving electrical signal, wherein the cantilevered probe tip is attached to the tuning fork element, the tuning fork element adapted for translating a motion of the cantilevered probe tip in a direction orthogonal to the oscillatory motion of the tuning fork element.

18. The apparatus as claimed in claim 17, further comprising:
a mirror for focusing the coherent light upon the sample at the tip location.

19. The apparatus as claimed in claim 18 adapted for implementation in a cryostat providing an environment for low temperatures and high magnetic fields, the apparatus being compacted for mounting within the cryostat.

20. The apparatus as claimed in claim 19, wherein said detector is further configured for measuring a nanoscale level photocurrent at a near field regime generated at a sample structure responsive to said applied coherent light and applied magnetic field.

21. The apparatus as claimed in claim 20, wherein said sample comprises a semiconductor device structure including a pair of contact electrodes, each electrode defining an edge, and said processor circuit further configured to map a plasmon excitation at a defined edge of the semiconductor device structure and its associated nanoscale level edge photocurrent.

22. The apparatus as claimed in claim 21, wherein said semiconductor device structure is near-charge neutral, said detector is configured for visualizing plasmon polaritons responsive to quantum transitions occurring in the near-charge neutral semiconductor device structure.

23. The apparatus as claimed in claim 19, further comprising:
   a sample platform for mounting the sample for a probing operation;
   a first positioning system operatively connected to said sample platform for orienting said sample platform mounting said sample in three dimensions; and
   a scanning device operatively connected to said sample platform for moving said sample platform in two dimensions during a probing operation.

24. The apparatus as claimed in claim 23, further comprising:
   a second positioning device operatively connected to said mirror for positioning said mirror in three dimensions for focusing the coherent light upon said sample.

25. The apparatus as claimed in claim 23, further comprising:
   a self-contained unit adapted for mounting within said cryostat vacuum chamber, said self-contained unit comprising:
      a first vessel structure for enclosing the first positioning system and for enclosing said scanning device, the sample platform being located above the first vessel structure,
      a first mounting structure for mounting the cantilevered probe tip of said self-sensing piezo-electric based probe above the sample platform;
      a second vessel structure for enclosing the second positioning system; and
      a second mounting structure for mounting the mirror above the second vessel structure in proximity to said sample platform.

26. The apparatus as claimed in claim 25, wherein said self-contained unit is adapted for placement within a pod mountable within said cryostat, the pod defining a three-dimensional space for receiving said self-contained unit.

27. The apparatus as claimed in claim 25, wherein the low temperature is less than 100° K and ranges from anywhere between 4° K-20° K.

28. The apparatus as claimed in claim 25, wherein the high magnetic field ranges from between −7 T to +7 T.

* * * * *